United States Patent [19]

Aoyagi et al.

[11] Patent Number: 4,879,705
[45] Date of Patent: Nov. 7, 1989

[54] AUTOMATIC LOADING DISC PLAYER

[75] Inventors: Yoshio Aoyagi, Kawagoe; Hiroyuki Hirano, Tokorozawa; Toshiyuki Kimura, Kawagoe; Susumu Niinuma, Kawagoe; Minoru Yoshioka, Kawagoe; Akira Haeno, Kawagoe; Takashi Sato, Kawagoe; Yoshiro Nishi, Kawagoe; Yoshihiko Watanabe, Kawagoe; Fumihiko Yokogawa, Tokorozawa; Keiichi Matsumoto, Tokorozawa; Youichi Ogawa, Tokorozawa, all of Japan

[73] Assignee: Pioneer Electronic Corporation, Tokyo, Japan

[21] Appl. No.: 244,641

[22] Filed: Sep. 12, 1988

Related U.S. Application Data

[63] Continuation of Ser. No. 727,747, Apr. 26, 1985, abandoned.

[30] Foreign Application Priority Data

| Apr. 27, 1984 | [JP] | Japan | 59-062307[U] |
| Apr. 27, 1984 | [JP] | Japan | 59-085783 |
| Apr. 27, 1984 | [JP] | Japan | 59-062305[U] |
| May 31, 1984 | [JP] | Japan | 59-111838 |

[51] Int. Cl.$^4$ ............ G11B 3/00; G11B 21/08
[52] U.S. Cl. ............ 369/32; 250/201; 360/72.2; 369/33; 369/44; 369/45
[58] Field of Search ............ 369/30, 32, 33, 41, 369/43, 44, 45, 50, 51; 250/201, 202; 360/72.2

[56] References Cited

U.S. PATENT DOCUMENTS

| 4,106,058 | 8/1978 | Romeas | 369/32 |
| 4,138,663 | 2/1979 | Lehureau | 365/215 |
| 4,325,133 | 4/1982 | Reitmoyer | 369/263 |
| 4,344,165 | 8/1982 | Akiyama | 369/44 |
| 4,375,091 | 2/1983 | Dakin | 360/72.2 |
| 4,476,499 | 10/1984 | Kanamaru | 360/72.2 |
| 4,553,231 | 11/1985 | Arc | 369/263 |
| 4,555,736 | 11/1985 | Mathieu | 369/32 |
| 4,611,317 | 9/1986 | Takeuchi | 369/50 |

FOREIGN PATENT DOCUMENTS

| 56-11901 | 9/1981 | Japan . |
| 56-11902 | 9/1981 | Japan . |
| 58-122675 | 7/1983 | Japan . |
| 59-42672 | 3/1984 | Japan . |
| 59-75465 | 4/1984 | Japan . |
| 59-121668 | 7/1984 | Japan . |

Primary Examiner—Steven L. Stephan
Attorney, Agent, or Firm—Fleit, Jacobson, Cohn, Price, Holman & Stern

[57] ABSTRACT

A disc player comprising a signal pickup unit to read information from a disc on which program information including address information is recorded, the signal pickup unit being movable with respect to the disc, pickup drive means to drive the pickup unit for movement with respect to the disc, and a control circuit including an address memory for storing the newest one of the addresses read from the disc, a counter operative to count addresses at predetermined time intervals for producing a signal representative of an expected address indicative of the position to which the pickup unit is expected to move in the next, the expected address being updated at predetermined time intervals, a detector circuit to produce a signal each time a discrepancy is found to exist between the newest address and the expected address. In response to the signal from the detector circuit, the pickup drive means is actuated to drive the pickup unit for movement to the position dictated by the newest address or the expected address.

12 Claims, 27 Drawing Sheets

Fig. 14A
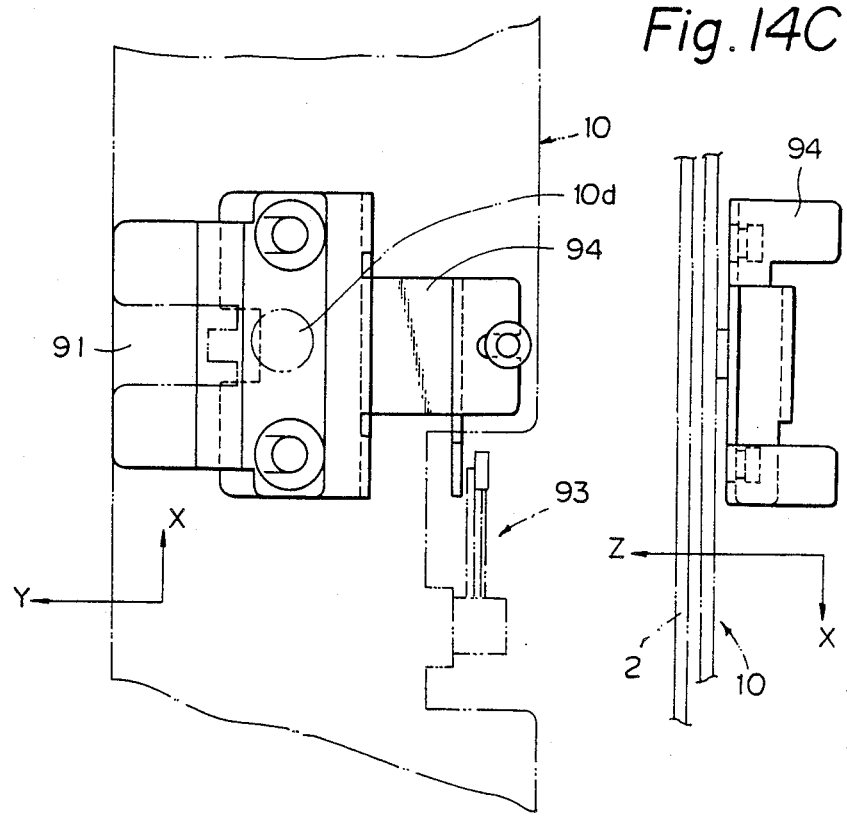
Fig. 14C
Fig. 14B
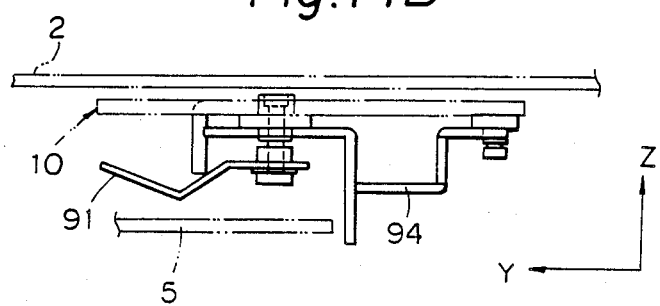

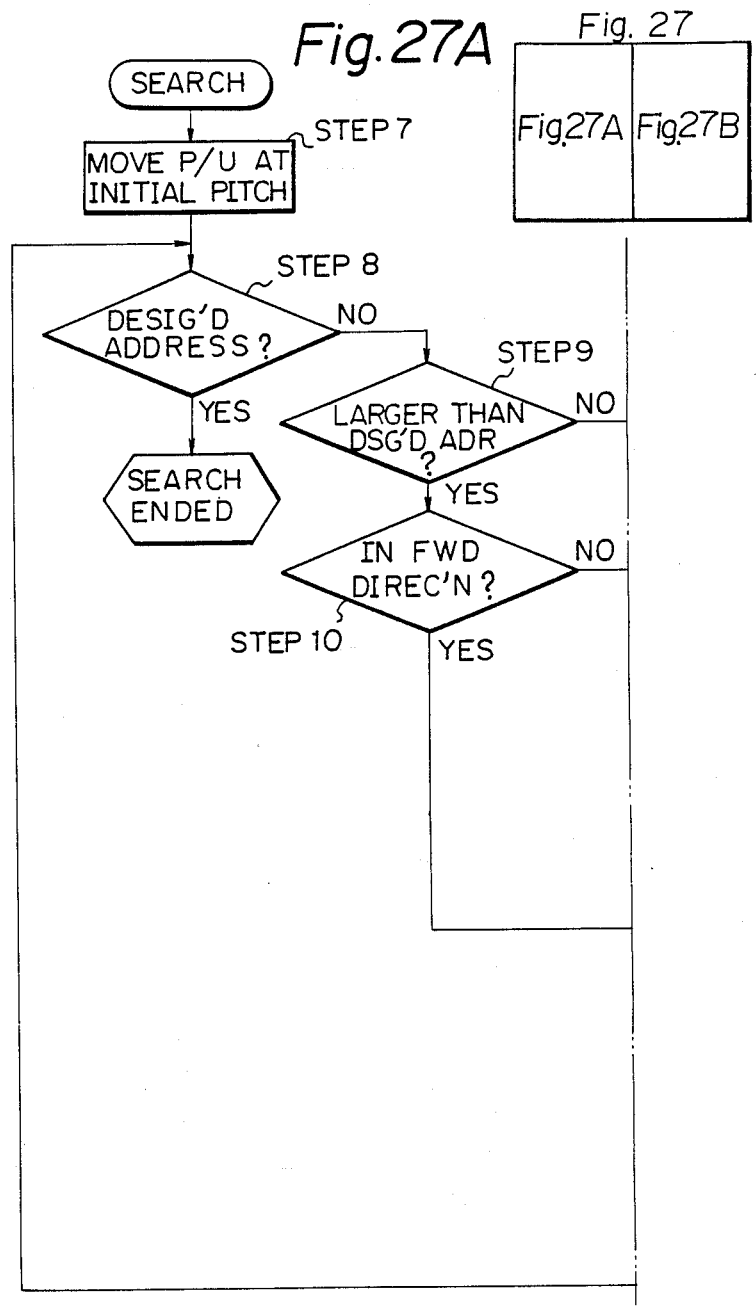

AUTOMATIC LOADING DISC PLAYER

This application is a continuation of application Ser. No. 727,747, filed Apr. 26, 1985 now abandoned.

FIELD OF THE INVENTION

The present invention relates to disc players and, particularly, to an automatic disc player which is equipped with means to automatically convey a disc to a position ready to be played back.

BACKGROUND OF THE INVENTION

Disc players to reproduce the information recorded on, for example, digital audio discs are now familiar as household appliances. These disc players are however originally designed on the assumption that they should do justice to indoor placement and have thus been unsuitable for outdoor uses or for installation on motor vehicles. In order that disc players of the existing designs be suitable use outdoors or in motor vehicle, they must be more compact in construction, more resistive to shocks and vibrations, more proof against an ingress of dust, and more easy to load the discs to be played back.

The present invention contemplates provision of an automatic disc player which will meet these requirements for disc players adapted for outdoor and automotive uses.

SUMMARY OF THE INVENTION

In accordance with one important aspect of the present invention, there is provided an automatic disc player comprising signal pickup means operative to read information from a disc on which program information including address information is recorded and to convert the information read from the disc into electric signals, the signal pickup means being movable with respect to the disc in a predetermined direction within the player and the information being read from the disc at an information pickup spot which is movable with respect to the tracks on the disc, pickup drive means operative to drive the signal pickup means for movement with respect to the disc in the player, and an electric control circuit including an address memory for storing the newest one of the addresses read from the disc by the signal pickup means, a counter operative to count addresses at predetermined time intervals for producing a signal representative of an expected address indicative of the position to which the pickup means is expected to move in the next, the expected address being updated at predetermined time intervals, a detector circuit operative to constantly detect a discrepancy between the newest address and the expected address and to produce a signal each time the discrepancy is found to exist, and pickup drive control means responsive to the signal from the detector circuit for actuating the pickup drive means to drive the pickup means for movement to the position dictated by one of the newest address and the expected address represented by the signal from the counter.

In accordance with another important aspect of the present invention, there there is provided an automatic disc player comprising signal pickup means operative to read information from a disc on which program information including address information is recorded and to convert the information read from the disc into electric signals, the signal pickup means being movable with respect to the disc in a predetermined direction within the player and the information being read from the disc at an information pickup spot which is movable with respect to the tracks on the disc, pickup drive means operative to drive the signal pickup means for movement with respect to the disc in the player, and an electric control circuit including an address memory for storing the newest one of the addresses read from the disc by the signal pickup means, a counter operative to count addresses at predetermined time intervals for producing a signal representative of an expected address indicative of the position to which the pickup means is expected to move in the next, the expected address being updated at predetermined time intervals, a detector circuit operative to constantly detect a discrepancy between the newest address and the expected address and to produce a signal each time the discrepancy is found to exist, and control means responsive to the signals from the detector circuit for producing a control signal when a predetermined number of signals are produced successively from the detector circuit, the control signal being supplied to the pickup drive means for driving the pickup means for movement to the position dictated by one of the newest address and the expected address represented by the signal from the counter.

The disc player thus constructed may further comprise tracking servo means for controlling the movement of the information pickup spot in a radial direction of the disc, the servo means having a predetermined operable range, the control circuit further comprising servo control means responsive to a signal from the detector circuit for broadening the operable range of the tracking servo means in response to the signal from the detector circuit and shifting the broadened operable range to the predetermined operable range in the absence of a signal produced from the detector circuit during a predetermined length of time after a signal has been produced therefrom.

In accordance with still another important aspect of the present invention, there there is provided an automatic disc player for playing back a disc having recorded thereon program information including address information, comprising optical signal pickup means operative to read information from the disc with a beam of radiation and to convert the information read from the disc into electric signals, the signal pickup means being movable with respect to the disc in a predetermined direction from and back to a predetermined home position and the information being read from the disc at an information pickup spot which is movable with respect to the tracks on the disc, pickup drive means operative to drive the signal pickup means for movement with respect to the disc in the player, and an electric control circuit including a focus monitor circuit for constantly monitoring the output signals from the signal pickup means to see if the radiation beam emitted from the signal pickup means is correctly focused on the record surface of the disc, the focus monitor circuit being operative to produce an output signal when it is found that the radiation beam emitted from the pickup means is incorrectly focused on the record surface of the disc, the pickup drive means being responsive to the signal from the focus monitor circuit for driving the signal pickup means for movement to the home position for permitting the pickup means to be adjusted so that the radiation beam to be directed at the disc can be correctly focused on the record surface of the disc.

BRIEF DESCRIPTION OF THE DRAWINGS

The features and advantages of an automatic disc player according to the present invention will be more clearly appreciated from the following description taken in conjunction with the accompanying drawings in which like reference numerals designate similar or corresponding assemblies, units, members and elements and in which:

FIGS. 14A–C show the arrangement of a disc guide member also included in the automatic disc player embodying the present invention, wherein (A), (B) and (C) are a plan view, a side elevation view, and a rear end view, respectively, of such arrangement;

DESCRIPTION OF THE PREFERRED EMBODIMENT

Figure 1:
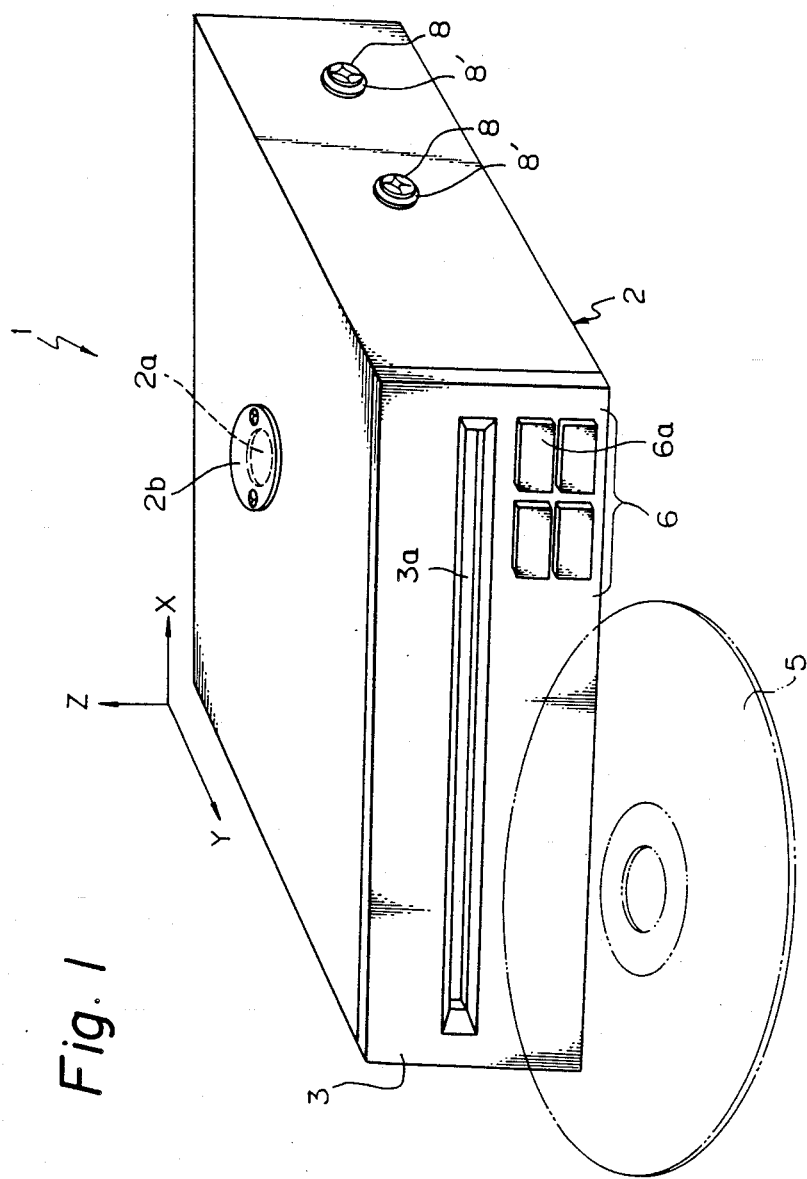
FIG. 1 is a perspective view showing the overall external construction of an automatic disc player embodying the present invention.

Referring to the drawings, first particularly to FIG. 1 thereof, an automatic disc player embodying the present invention, as denoted in its entirety by reference numeral 1 comprises a housing 2 having a front panel 3 as well as side panels and a rear panel. The front panel 3 of the housing 1 is formed with a horizontally elongated slot 3a through which a video and/or audio disc 5 to be played back can be loaded rearwardly into the automatic disc player. On the front panel 3 are provided pushbuttons 6 such as "START" and "EJECT" buttons as is customary.

It may be noted that the rear direction of the automatic disc player as herein referred to occurs in a horizontal fore-and-aft direction indicated by arrow Y in FIG. 1. Thus, the direction indicated by arrow X in FIG. 1 is a horizontal lateral direction of the automatic disc player and the direction of arrow Z in FIG. 1 is a vertical direction of the automatic disc player. The direction of the arrow Z in particular is normal to the plane on which the disc 5 is to be positioned within the housing 2 during playback operation. It may be further noted that the video and/or audio disc 5 herein shown is assumed, by way of example, to be 5 inches in diameter and of the type which uses laser beams when in writing and reading information.

The internal mechanical construction of the automatic disc player is shown in detail in FIGS. 2 to 6. Of these FIGS. 2 to 6, FIGS. 2 to 5 show the initial condition of the automatic disc player prior to the start of a playback operation. As seen in FIGS. 2 to 6, the housing 2 has accommodated therein a chassis structure 7 which is composed of two chassis members 7a and 7b. These chassis members 7a and 7b are rigidly coupled together by suitable fastening means (not shown) and constitute a principal support structure in the housing 2. The chassis structure 7 as a whole is secured to the housing 2 by means of four screws 8 and rubber bushings 8' respectively attached to the screws 8 as illustrated to an enlarged scale in FIG. 7.

Within the housing 2 is further accommodated a tray structure 10 which is movable forwardly and backwardly with respect to the housing 1. The tray structure 10 is composed of a generally L-shaped base member 10a and a left side member 10b which is securely attached to a left side wall portion of the base member 10a by means of, for example, screws as will be best seen in FIG. 6. The main chassis member 7a of the chassis structure 7 has a right side wall portion, to which a bracket member 12 is securely attached also by means of, for example, screws as shown. The bracket member 12 is formed with a pair of slots 12a each elongated in the direction of the arrow Y. The base member 10a of the tray structure 10 has a right side wall portion having a pair of guide pins 10c. The guide pins 10c project from the side wall portion of the base member 10a rightwardly of the housing 2 and are slidably received in these slot 12a, respectively, in the bracket member 12, thus allowing the tray structure 10 to move forwardly and backwardly with respect to the bracket member 12 and accordingly to the chassis structure 7.

On the right and left sides of the chassis structure 7 are positioned a pair of movable members 13 and 14 each of which is constructed of, for example, a rigid plastic. The right movable member 13 is located between the tray structure 10 and the bracket member 12 and is formed with a pair of slots 13a also elongated each in the direction of the arrow Y. The guide pins 10c on the right side wall portion of the base member 10a extend through these elongated slots into the slots 12a in the bracket member 12, as will be best seen in FIG. 5. The movable member 13 is thus movable forwardly and backwardly along the slots 13a therein as well as the slots 12a in the bracket member 12 with respect to the tray structure 10 and accordingly to the chassis structure 7. On the other hand, the movable member 14 positioned on the left side of the tray structure 10 is supported slidably on a guide bar 15 secured to the chassis structure 7. The guide bar 15 extends in the direction of the arrow Y and is securely connected at its opposite ends to lug portions projecting from the left side wall portion of the main chassis member 7a as will be best seen in FIG. 6. The left movable member 14 is also formed with a pair of slots 14a each elongated in the direction of the arrow Y, and the left side member 10b of the tray structure 10 has a pair of guide pins 10e on its left side wall portion. The pins 10e on the side member 10b are respectively aligned with the pins 10c on the base member 10a and, likewise, the slots 14a in the movable member 14 are respectively aligned with the slots 13a in the right movable member 13 each in the direction of the arrow X. The guide pins 10e projects from the side member 10b leftwardly of the housing 2 and are slidably received in the slots 14a, respectively, in the movable member 14, as will be best seen in FIG. 4. The movable member 14 is thus movable forwardly and backwardly along the slots 14a with respect to the tray structure 10 and accordingly to the chassis structure 7. Though not seen in the drawings, the tray structure 10 is slidably supported on the guide bar 15 at two locations of the structure 10 which are spaced apart from each other in the direction of the arrow Y.

In the neighborhood of the rear end of the tray structure 10 is positioned an interlocking shaft 17 which extends in the direction of the arrow X. The interlocking shaft 17 is pivotally supported on the tray structure 10 through appropriate holes provided in the structure 10 and has a pair of arms 17a and 17b securely carried at its opposite ends, respectively, by means of, for example, screws or studs. Guide pins 17c and 17d project toward each other from these arms 17a and 17b, respectively, and are aligned together in the direction of the arrow X. These guide pins 17c and 17d are slidably received in vertically elongated slots 13b and 14b formed in rear portions of the right and left movable members 13 and 14, respectively. The slots 13b and 14b are aligned with each other in the direction of the arrow X.

Figure 3:
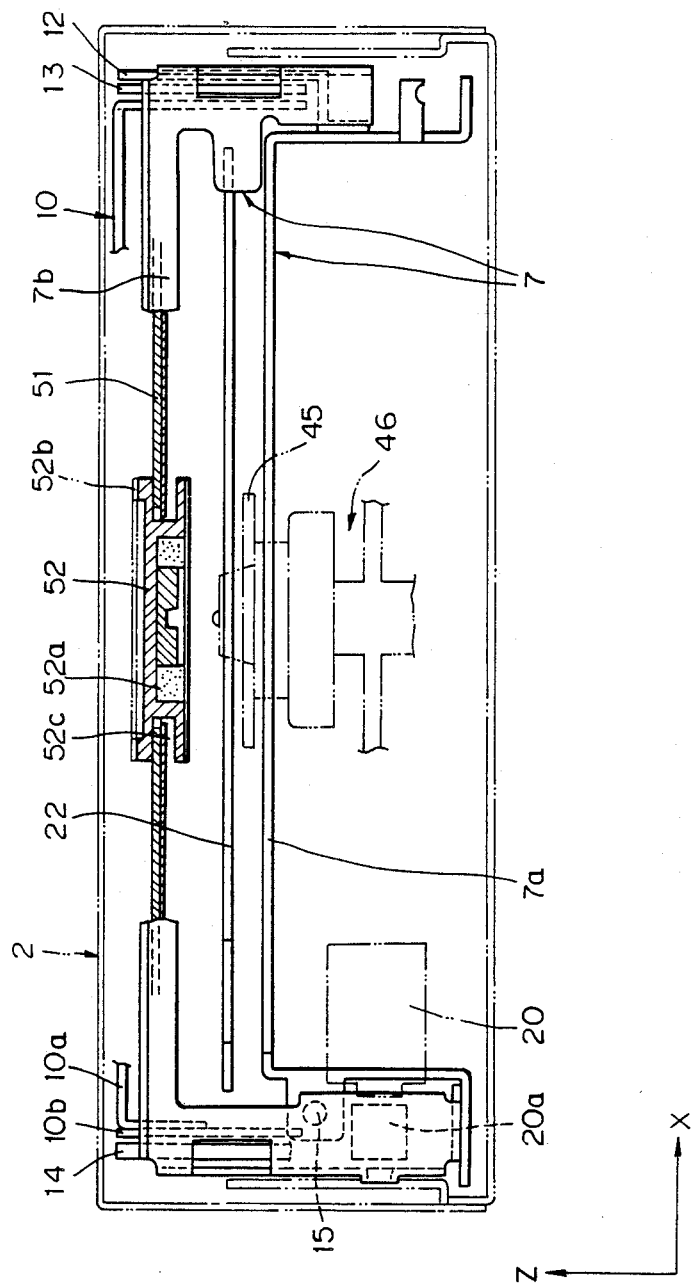
FIG. 3 is a front elevation view showing the internal construction of the automatic disc player embodying the present invention.
Figure 4:
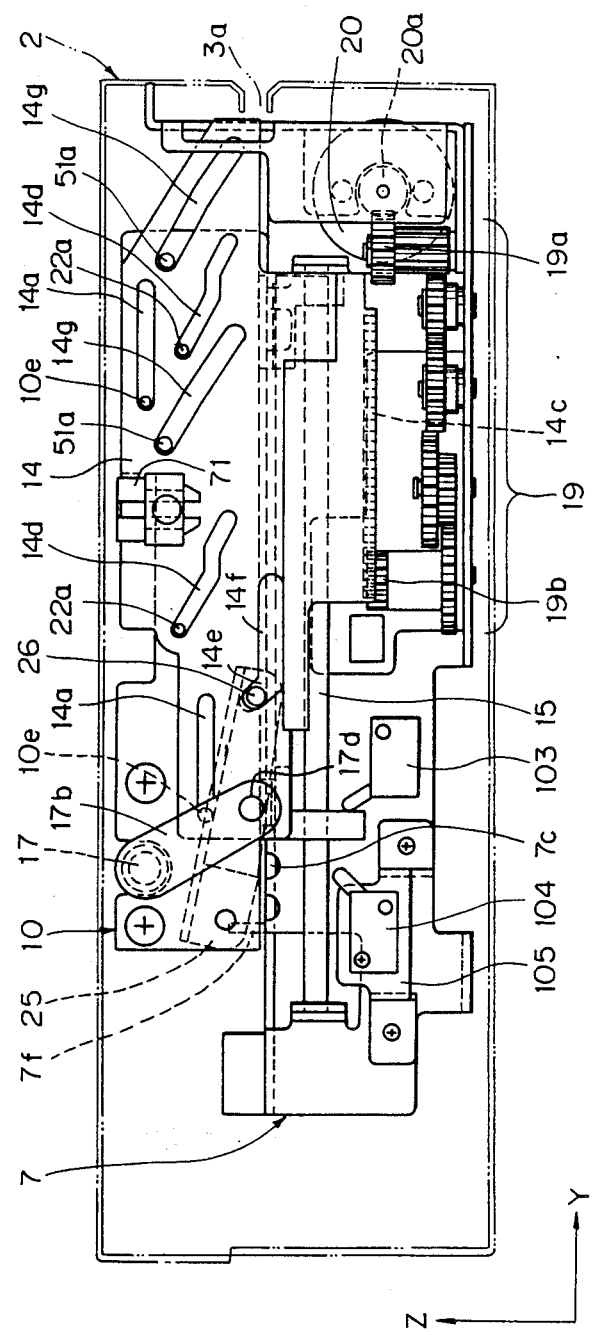
FIG. 4 is a side elevation view showing the internal construction of the automatic disc player embodying the present invention as viewed from one side of the player.

On the left side wall portion of the main chassis member 7a is supported a reduction gear unit 19 including a certain number of gears which are in mesh with one another and which have respective axes of rotation in vertical directions. As shown in FIG. 4, these gears, include a first-stage gear 19a and a final-stage gear 19b. A main drive motor 20 of the reversible design is held in position in front of this reduction gear unit 19 and has an output shaft having an axis of rotation in the direction of the arrow X. The motor output shaft has securely carried thereon a worm gear 20a (FIGS. 3 and 4) which is held in mesh with the first-stage gear 19a of the reduction gear unit 19. The final-stage gear 19b of the reduction gear unit 19 is held in mesh with a rack member 14c which is secured to or forms part of the left movable member 14 as will be seen in FIG. 4. The rack member 14c is formed along the lower end of the movable member 14 and extends in the direction of the arrow Y. The location at which the rack member 14c is thus in mesh with the final-stage gear 19b is located intermediate or, preferably approximately at a middle point, between the above mentioned two locations of the tray structure 10 which are spaced apart from each other in the direction of the arrow Y. The interlocking shaft 17, reduction gear unit 19 and main drive motor 20 thus arranged as well as the members and elements carried thereon form drive means operable for driving the right and left movable members 13 and 14 to move back and forth each in the direction of the arrow Y with respect to each of the chassis and tray structures 7 and 10 as will be better understood as the description proceeds.

Figure 17:
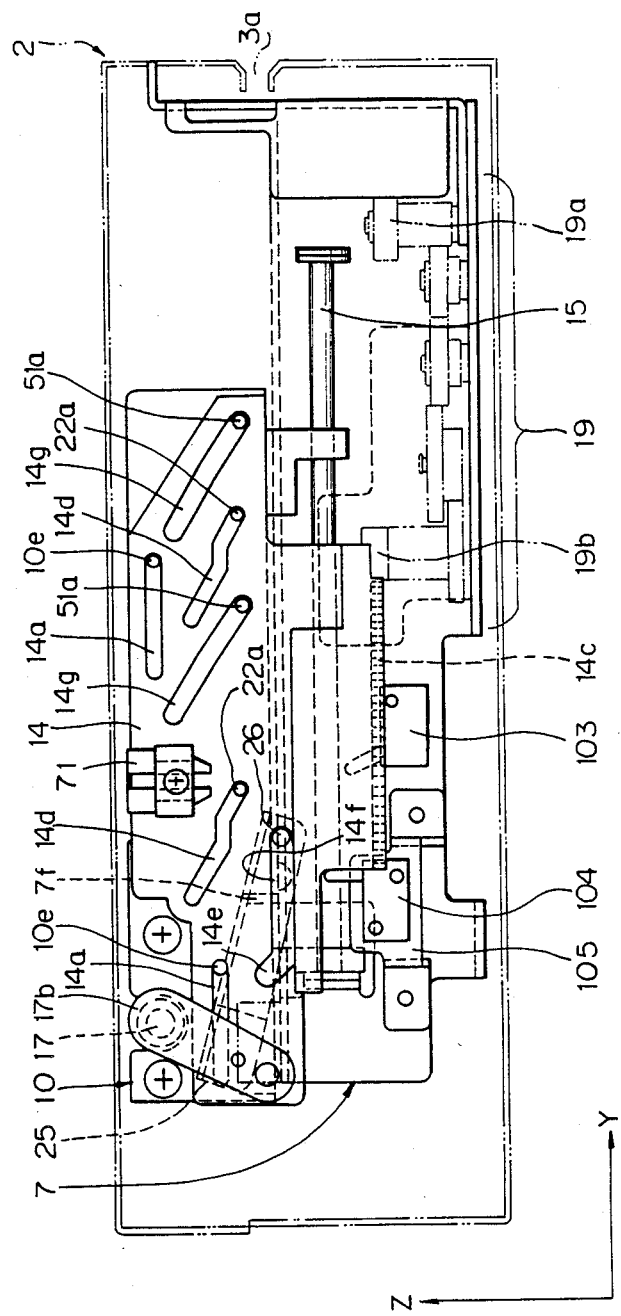

The tray structure 10 and the right and left movable members 13 and 14 as above described form part of disc carrier means of the automatic disc player embodying the present invention. In the embodiment herein shown, the disc carrier means further comprises a generally U-shaped disc transfer plate 22 which is movably positioned below the tray structure 10 and between the movable members 13 and 14. This disc transfer plate 22 is moved to a position above the turntable (indicated at 45 in FIG. 3) to transfer a disc 5 to the turntable and is thus generally U-shaped to accommodate an upper portion of the turntable when moved to such a position. The disc transfer plate 22 has attached to its upper face on which a disc 5 is to be received an appropriate soft protective lining or coating such as, for example, a web 23 of felt (FIG. 6) to protect the surface of the disc from direct contact with the transfer plate surface. The disc transfer plate 22 has two pairs of guide pins projecting from side lug portions of the transfer plate 22, the pins consisting of a pair of front guide pins 22a aligned with and extending away from each other in the vicinity of the front end of the transfer plate and a pair of rear guide pins 22a' aligned with and extending away from each other in the vicinity of the front end of the transfer plate 22. The front guide pins 22a are slidably received in vertically elongated slots 10f located in a front end portion of the right side wall of the base member 10a of the tray structure 10 and a front end portion of the side member 10b of the tray structure 10. Similarly, the rear guide pins 22a' are slidably received in vertically elongated slots 10f' located in a rear end portion of the right side wall of the base member 10a and a front end portion of the side member 10b. The slots 10f and 10f' in the base member 10a are respectively aligned with the slots 10f and 10f' in the side member 10b in the direction of the arrow X. The disc transfer plate 22 is thus movable upwardly and downwardly with respect to the tray structure 10 and accordingly to the chassis structure 7 over distances limited by the lengths of the slots 10f and 10f'. The front guide pins 22a are passed through the slots 10f in the tray structure 10 and further extend through stepping cam holes 13d and 14d formed in the right and left movable members 13 and 14, respectively. Likewise, the rear guide pins 22a' are passed through the slots 10f' in the tray structure 10 and further extend through stepping cam holes 13d' and 14d' formed in the right and left movable members 13 and 14, respectively. The slots 13d and 13d' are respectively aligned with the slots 14d and 14d' each in the direction of the arrow X. As will be best seen in FIGS. 4 and 5, each of these cam holes 13d, 13d', 14d and 14d' consists of a front ramp portion slightly slanting upwardly and rearwardly, a horizontal intermediate portion extending in the direction of the arrow Y from the rear end of the front ramp portion, and a rear ramp portion slightly slanting upwardly from the rear end of the intermediate portion. Thus, the disc transfer plate 22 is movable on a horizontal plane with respect to the movable members 13 and 14 when the guide pins 22a are located in the intermediate portions of the cam holes 13d and 14d in the movable members 13 and 14, respectively. With the guide pins 22a located either in the front ramp portions or in the rear ramp portions of the cam holes 13d and 14d and the guide pins 22a' located in the front or rear ramp portions of the cam holes 13d and 14d, respectively, the disc transfer plate 22 is movable upwardly above or downwardly below the above mentioned horizontal plane. When the guide pins 22a and 22a' are located in the front or rear ramp portions of the respectively associated cam holes, the disc transfer plate 22 is thus movable upwardly above or downwardly with respect to the movable members 13 and 14 depending upon the direction in which the transfer plate 22 is to be moved in the direction of the arrow Y. The guide pins 22a and 22a' and the respectively associated cam holes in the movable members 13 and 14 constitute means which allow the disc transfer plate 22 to move upwardly or downwardly across a horizontal plane which is fixed with respect to the turntable and which is movable with respect to each of the chassis and tray structures 7 and 10 and to the turntable as will be understood more clearly. It may be herein noted that the foremost and lowermost ends of the cam holes 13d, 14d, 13d' and 14d' in the movable members 13 and 14 as shown in FIG. 17 are located so that, when the disc transfer plate 22 is carried on the movable members 13 and 14 with these pins located at these ends of the cam holes, the upper disc-carrying face of the plate 22 is slightly lower than a plane flush with the upper end face of the turntable as will also be understood more clearly as the description proceeds. The disc transfer plate 22 is held against movement with respect to the tray structure in the direction of the arrow Y with the guide pins 22a and 22a' received in the vertically elongated slots 10f and 10f', respectively, in the tray structure 10.

During loading of a disc into the automatic disc player, the disc transfer plate 22 is fixedly held in position with respect to the tray structure 10 until the disc 5 placed on the transfer plate 22 being moved with respect to the chassis structure 7 reaches a position having its center axis aligned with the center axis of the turntable. When the disc on the disc transfer plate 22 reaches such a position with respect to the turntable, the disc transfer plate 22 is unlocked from the tray structure 10, as will be understood more clearly as the description proceeds. Thus, the automatic disc player embodying the present invention further comprises lock/unlock means adapted to have the disc transfer plate 22 locked to and unlocked from the tray structure 10 depending upon the position of the tray structure 10 with respect to the turntable and accordingly to the chassis structure 7.

Figure 6:
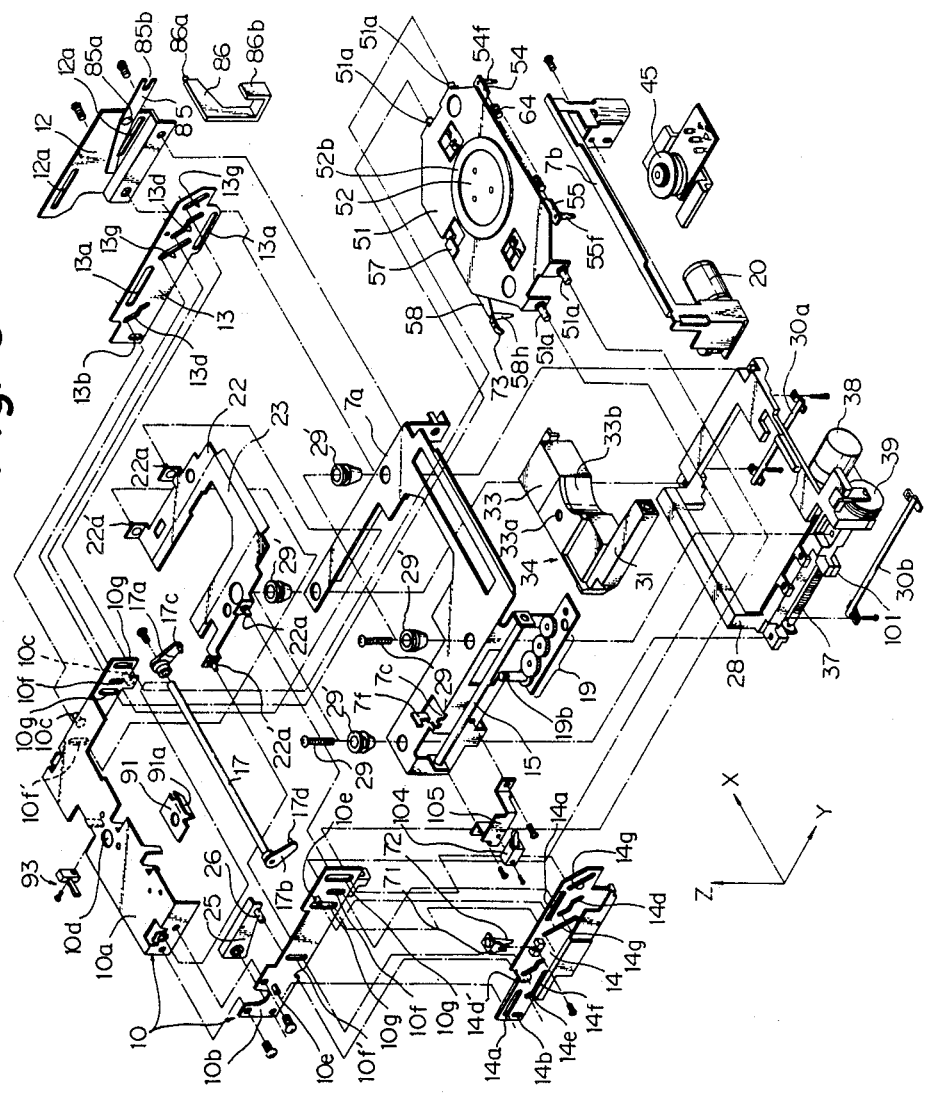
FIG. 6 is an exploded view of the internal construction of the automatic disc player embodying the present invention.

As shown in FIGS. 4 and 6, such lock/unlock means of the automatic disc player embodying the present invention comprises a lever 25 pivotally connected at one end to a rear end portion of the side member 10b of the tray structure 10. The lever 25 is thus rockable about an axis in the direction of the arrow X and has a locking pin 26 projecting from a foremost leading end portion of the lever 25 in parallel with the axis of rotation of the lever 25. Depending upon the position of the movable member 14 with respect to the tray structure 10, the locking pin 26 thus projecting from the lever 25 is selectively received either in a cutout 5c formed in the main chassis member 7a or in a cam slot 14e formed in the left movable member 14. The cutout 7c in the main chassis member 7a is located at the upper end of the left side wall portion of the main chassis member 7a as shown in FIG. 6, and the cam slot 14e in the movable member 14 is located on a plane flush with the upper surface of the main chassis member 7a as will be seen from FIG. 4. The cam slot 14e in the movable member 14 forms a rear end portion of a slot 14f also formed in the left movable member 14 and merges rearwardly and slightly upwardly out of the slot 14f which is elongated in the direction of the arrow Y as will be best seen in FIG. 4. The locking pin 26 on the lever 25 is thus movable into this elongated slot 14f to allow the movable member 14 to move with respect to the tray structure 10 or vice versa. The elongated slot 14f is located so that the slot 14f is flush with the cutout 7c when the tray structure 10 assumes a predetermined position above the turntable. The predetermined position of the tray structure 10 as herein referred to is such that, with the tray structure 10 in this position, the disc 5 placed on the disc transfer plate 22 prior to the start of playback operation has its center axis aligned with the center axis of the turntable over which the transfer plate 22 is positioned. While the tray structure 10 carried on the movable members 13 and 14 is being moved toward such a predetermined position in the direction of the arrow Y with the locking pin 26 located in the cam slot 14e, the disc transfer plate 22 is locked to the tray structure 10 and is prohibited from being moved vertically with respect to the tray structure 10. Once the tray structure 10 is moved to such a position above the turntable, the locking pin 26 on the lever 25 is allowed to enter the elongated slot 14f in the movable member 14 and permits the tray structure 10 with respect to the movable member 14 along the elongated slot 14f. This in turn permits the disc transfer plate 22 to move vertically (viz., downwardly) with respect to the tray structure 10 with the guide pins 22a and 22a' of the transfer plate 22 moving along the stepping holes 13d, 14d, 13d' and 14d' in the movable members 13 and 14 as well as the vertically elongated slots 10f and 10f' in the tray structure 7. The location of the cam slot 14e in the movable member 14 is further such that the slot 14e is allowed to align the cutout 7c in the chassis member 7a in the direction of the arrow X when the tray structure 10 is moved to the predetermined position above the turntable. When the tray structure 10 reaches the predetermined position, the locking pin 26 on the lever 25 is thus received in the cutout 7c in the chassis member 7a while the pin 26 is moving from the cam slot 14e into the elongated slot 14f. This provides locking engagement between the chassis and tray structures 7 and 10 through the locking pin 26 in the cutout 7c so that the tray structure 10 is locked to the housing 2.

The combination of the above described drive and lock/unlock means as well as the chassis and tray structures 7 and 10, movable members 13 and 14 and disc transfer plate 22 forms disc transfer means to move a disc to a predetermined position with respect to the turntable in the automatic disc player embodying the present invention.

The automatic disc player embodying the present invention further comprises disc playback means adapted to play back the disc thus moved to the predetermined position above the turntable.

Figure 8:
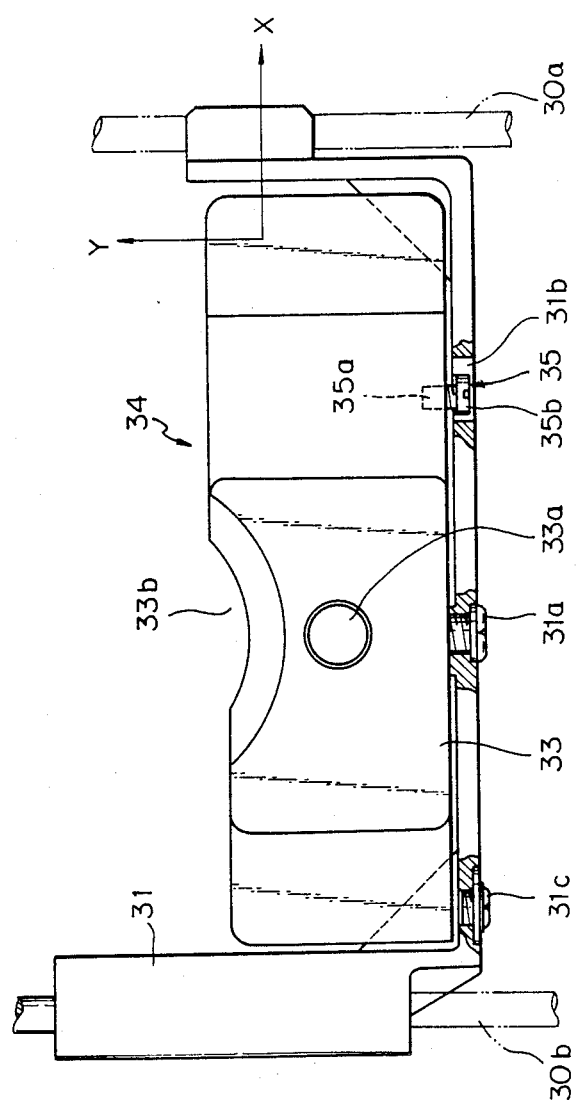
FIG. 8 is a plan view showing the arrangement of a carriage assembly also forming part of the automatic disc player embodying the present invention.
Figure 9:
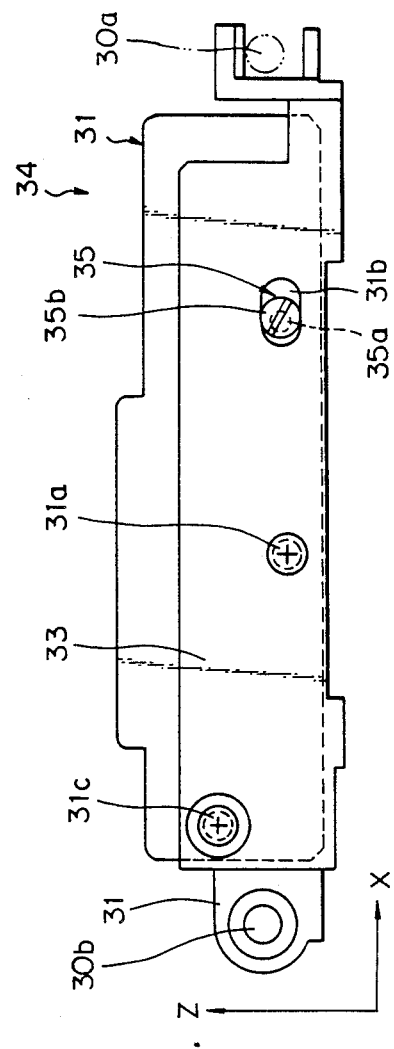
FIG. 9 is a rear end view of the carriage assembly illustrated in FIG. 8.
Figure 10:
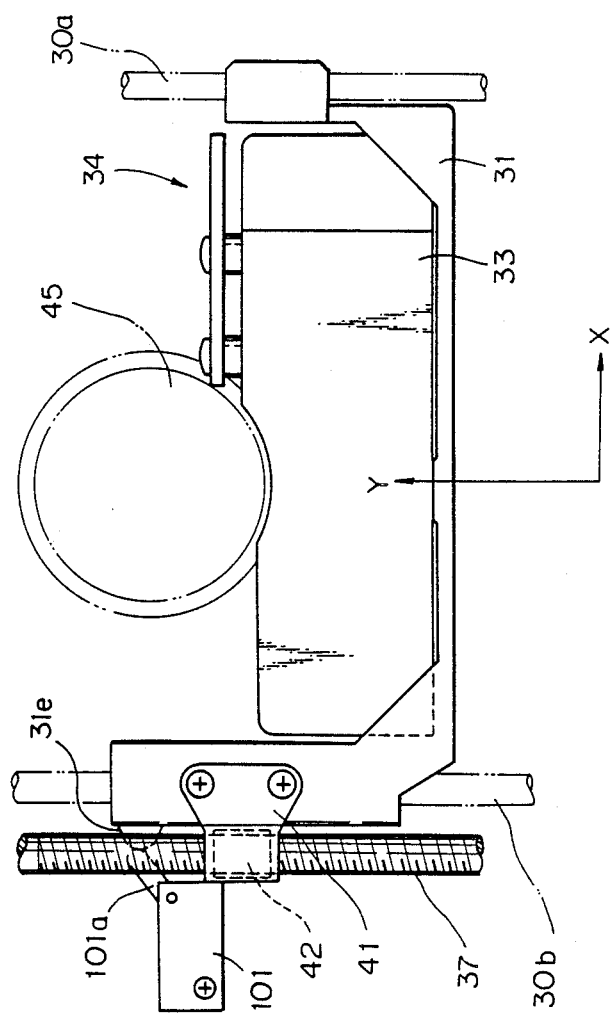
FIG. 10 is a view similar to FIG. 8 but additionally shows drive means for the carriage assembly.

The disc playback means is also enclosed within the housing 2 and comprises a generally U-shaped support structure 28 positioned below the chassis structure 7 as shown in FIG. 6. The support structure 28 is securely attached to the lower face of the main chassis member 7a of the chassis structure 7 by means of for screws 29 and rubber bushings 29'. To this support structure 28 are secured a pair of guide rods 30a and 30b which are spaced apart in parallel from each other in the direction of the arrow X and which extend in the direction of the arrow Y. These guide rods 30a and 30b are securely attached to the support structure 28 by means of, for example, screws and fittings as shown. A generally U-shaped slider 31 has two side portions slidably received on these guide rods 30a and 30b, respectively, as shown in FIGS. 8 to 10 and is thus movable back and forth in the direction of the arrow Y with respect to the chassis structure 7. The slider 28 has a generally box-shaped casing 33 rotatably mounted on an intermediate portion of the slider 28 by means of a screw or pivot element 31a which has a center axis in the direction of the arrow Y. The casing 33 is thus pivotally movable with respect to the slider 28 about an axis parallel with the direction of movement of the slider 28 with respect to the chassis structure 7. The casing 33 has enclosed therein optical signal pickup means including an objective lens 33a fitted in the upper wall portion of the casing 33. The objective lens 33a forming part of the optical signal pickup means is provided to have a laser spot focused on the surface of the disc placed on the turntable for reading information from the record surface of the disc. The optical signal pickup means of this nature is per se well known in the art and, as such, detailed construction thereof is not herein illustrated.

As shown in FIGS. 8 and 9, the slider 28 has in its intermediate portion a slot 31b which is elongated in a direction which passes through the center axis of the screw or pivot element 31a. An offset-head screw 35 has its threaded step portion 35a driven into a rear wall portion of the casing 33 with its circular head portion 35b received in the elongated slot 31b and offset from the stem portion 35a. Thus, the casing 33 is driven to turn minutely about the center axis of the screw or pivot element 31a by turning the offset-head screw 35 in either direction about the axis of the screw 35. The offset-head screw 35 and the slot 31b provide means to adjust the angular position of the casing 33 about the center axis of the screw or pivot element 31a and accordingly calibrate the tangential position of the pickup means with respect to the disc to be played back. After the optical signal pickup means is thus calibrated, the casing 33 is secured the slider 28 by tightening a set screw 31c fitted through the slider 28 into the casing 33 as shown.

Figure 2:
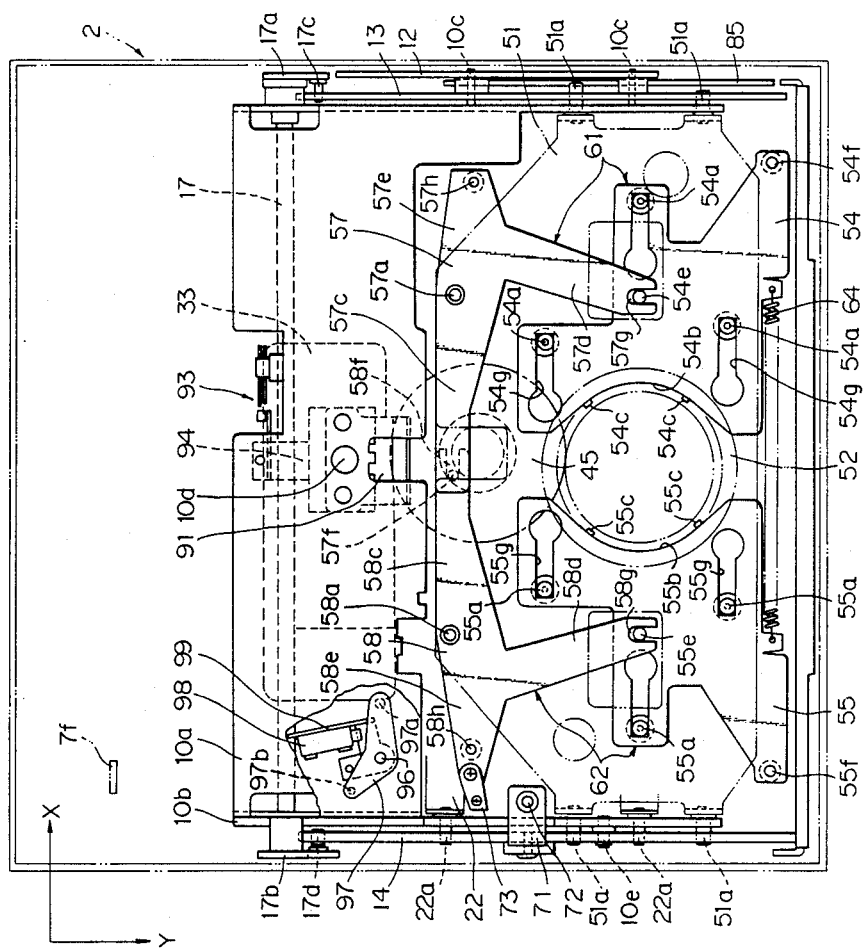
FIG. 2 is a plan view showing the internal construction of the automatic disc player embodying the present invention.

The base member 10a of the tray structure 10 is formed with a circular opening 10c as shown in FIGS. 2 and 6. The opening 10c in the tray structure 10 is located to be vertically aligned with the objective lens 33a in the casing 33 when the tray structure 10 is in the above mentioned predetermined position above the turntable and concurrently the casing 33 is in a predetermined home position with respect to the turntable. The home position of the casing 33 is the position which the casing 33 assumes when the signal pickup means in the casing 33 is ready to operate on the disc placed on the turntable. The opening 10c thus formed in the tray structure 10 provides an access to the outer surface of the objective lens 33a in the casing 33 and enables the user of the player to wipe off or otherwise clean the lens 33a from the outside of the casing 33 without having recourse to removing some component members of the disc transfer means. If desired, such an opening may be provided, rather than in the tray structure 10, in any member forming part of the disc transfer means if the member is to intervene between the lens 33 and the tray structure 10 when the tray structure 10 and the casing 33 are in the above mentioned positions thereof with respect to the turntable. Where it is desired to have the lens 33 cleaned from the outside of the housing 2, an opening may be formed in the upper panel of the housing 2 as indicated at 2a in FIG. 1. This opening 2a is also located to align with the lens 33 when the tray structure 10 and the casing 33 are in the above mentioned positions thereof with respect to the turntable. A suitable cover element 2b may be movably or detachably attached to the upper panel of the housing 2 to close the opening 2b except when the opening 2b is to be used. The openings thus provided in the tray structure 10 and the housing 2 may be used not only for the cleaning of the lens 33a but for the calibration of the radiation power to be achieved of the optical signal pickup means enclosed within the casing 33.

The combination of the slider 28 and casing 33 constructed and arranged as above described form a carriage assembly 34 in the disc transfer means of the automatic disc player embodying the present invention.

The support structure 28 also forming part of the disc playback means has a left side portion carrying a screw shaft 37 as shown in FIGS. 6 and 10. The screw shaft 37 extends in parallel with the guide rods 30a and 30b, viz., in the direction of the arrow Y and has its opposite end portions journaled in lug portions projecting from the left side portion of the support structure 28. In front of this screw shaft 37 is positioned a reversible motor 38 having an output shaft having a center axis in the direction of the arrow Y and carrying a drive pulley thereon, though not seen in the drawings. In association with this driven pulley is provided a driven pulley 39 which is securely mounted on a shaft axially aligned with and coupled to the screw shaft 37. An endless belt is passed between these drive and driven pulleys and completes drive transmission means from the motor 38 to the screw shaft 37. The slider 28 forming part of the above mentioned carriage assembly 34 has a bracket member 41 securely attached by means of, for example, screws to the left side portion of the slider 31 as shown in FIG. 10. The bracket member 41 is preferably constructed of a spring steel plate which is elastically deformable in the direction of the arrow Z. The bracket member 41 extends over the screw shaft 37 and has a semicylindrical nut member 42 securely attached to the lower face of the bracket member 41. The nut member 42 is held in mesh with the screw shaft 37 so that the slider 31 carrying the nut member 42 is driven for forward or backward movement along the screw shaft 37 when the screw shaft 37 is rotated in either direction about the center axis thereof. The screw shaft 37, the nut member 42 and the above mentioned drive transmission means to drive the screw shaft 37 from the motor 38 form, in combination, carriage drive means to drive the carriage assembly 34 to move back and forth in the direction of the arrow Y with respect to the support structure 28 and accordingly to the housing 2.

Figure 7:
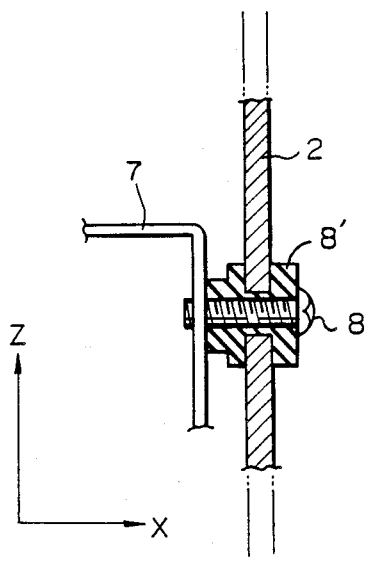
FIG. 7 is a sectional view showing the arrangement in which a chassis structure forming part of the automatic disc player embodying the present invention is supported in the housing structure.
Figure 11:
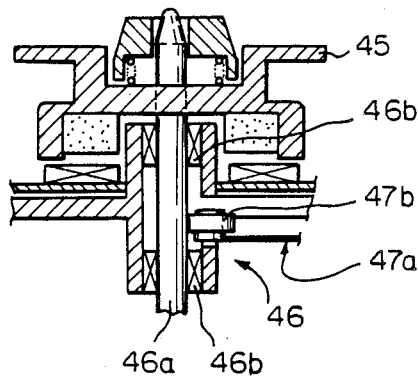
FIG. 11 is a vertical sectional view showing the turntable structure forming part of the automatic disc player embodying the present invention.
Figure 12:
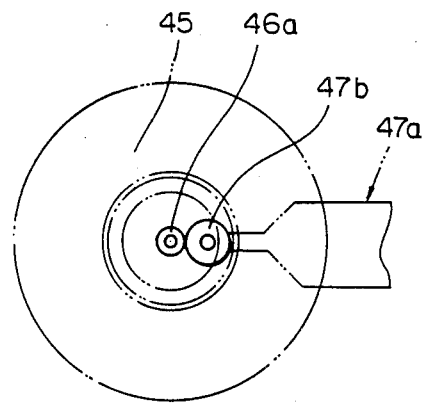
FIG. 12 is a plan view of the turntable structure illustrated in FIG. 11.

FIGS. 11 and 12 of the drawings show the construction and arrangement of a turntable assembly including the turntable which has been referred to frequently. The turntable assembly is supported on the above mentioned support structure 28 and is positioned on an extension of the direction of movement of the above described carriage assembly 34, largely intervening between the carriage assembly 34 and the above described carriage drive means. As illustrated in FIGS. 7 and 8, the turntable, now designated by reference numeral 45, is supported by a spindle-drive motor 46 and is directly driven for rotation by the motor 46. The spindle-drive motor 46 has an output shaft 46a journaled in bearings 46b received in a bearing retainer portion of the support structure 28. Ordinarily a gap of the order of about ten microns exists between the motor output shaft 46a and each of the bearings 46b. Such a gap is minimized by shaft retaining means 47a including an idler roller 47b held in rollable engagement with an axial portion of the shaft 46a as shown. The output shaft 46a of the spindle-drive motor 46 is maintained in close contact with the bearings 46b by means of this idler roller 47b and assures smooth and uniform rotation of the turntable 45. The previously mentioned disc playback means of the automatic disc player embodying the present invention is constituted by the combination of the support structure 28, guide rods 30a and 30b, carriage assembly 34, carriage drive means, turntable 45, spindle-drive motor 46 and idler 47b as above described. As shown in FIGS. 6 and 9, the casing 33 forming part of the carriage assembly 34 has in its front wall portion a rearwardly recessed concavity 33b having an arcuate cross section on a horizontal plane. This concavity 33b is provided to accommodate portions of the turntable 45 and the spindle-drive motor 46 when the carriage assembly 34 is held in its home position with respect to the turntable 45.

The support structure 28 is coupled to the chassis structure 7 by means of the four screws 29 respectively associated with the rubber bushings 29' as previously noted. The rubber bushings 29' are used for the purpose of protecting the above mentioned disc playback means, particular, the turntable 45 from shocks and vibrations that may be transferred thereto from the outside of the player system as, typically, when the player is installed on a motor vehicle. In this instance, it is preferable the locations at which the support structure 28 is coupled to the chassis structure 7 by such fastening means be such that are disposed symmetrically on a circle having its center at the middle point between an extension of the axis of rotation of the turntable 45 and the middle point of the linear locus to be described by the center of gravity of the carriage assembly 34. Such arrangement of the rubber bushings 29' will provide a maximum shock and vibration attenuation efficiency by the bushings 29'. While the particular arrangement of the bushings 29' is prefered in view of the displacement of the center of gravity of the carriage assembly 34, approximately similar results will be achieved if the locations of the rubber bushings 29' are determined so that the bushings are disposed symmetrically on a circle having its center at the center of gravity of the disc playback means when the center of gravity of the carriage assembly 34 is located at the middle point of the linear locus to be described by the center of gravity of the carriage assembly 34.

Figure 5:
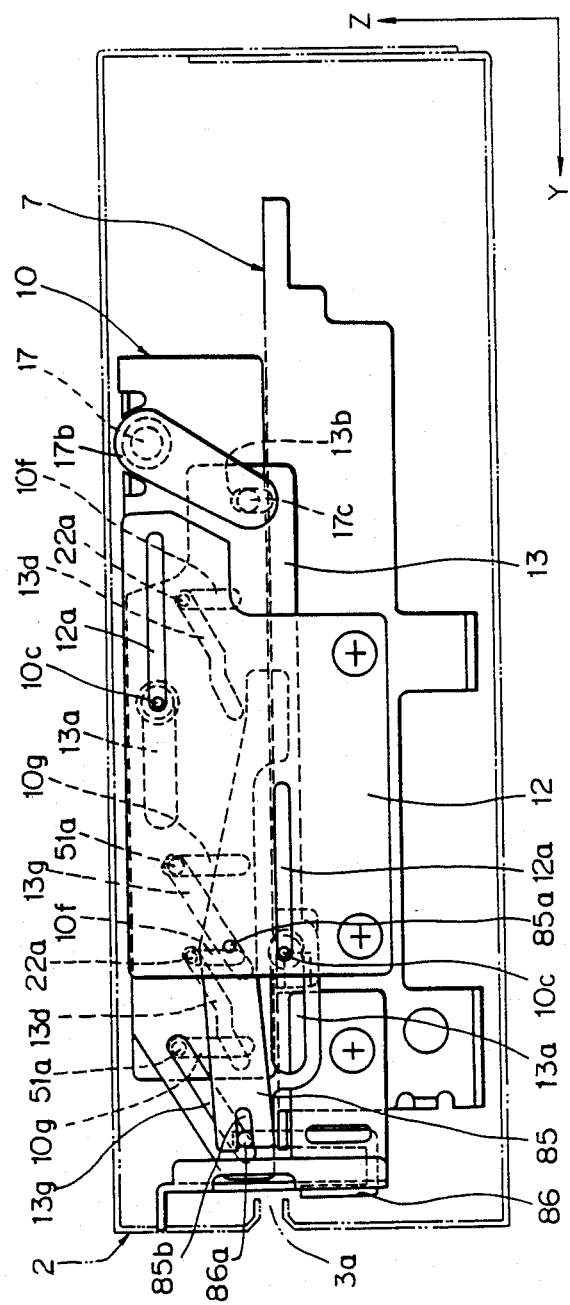
FIG. 5 is also a side elevation view of the internal construction of the automatic disc player embodying the present invention but viewed from the opposite side of the player.

The automatic disc player embodying the present invention further comprises disc clamp means for claming a disc 5 on the turntable 45 after the disc 5 has been conveyed to the predetermined position with respect to the turntable 45. In the embodiment of the automatic disc player herein shown, such disc clamp means comprises a largely rectangular horizontal support plate 51 which is positioned between the right and left movable members 13 and 14 and above the turntable 45 as will be seen from FIGS. 2, 3 and 6. The support plate 51 has a pair of lug portions depending downwardly from each of the right and left side edges thereof. Guide pins 51a project rightwardly from the two lug portions at the right edge of the plate 51 and are slidably received in slots 10g formed in the right side wall portion of the base member 10a of the tray structure 10. Likewise, guide pins 51a project leftwardly from the two lug portions at the left edge of the plate 51 and are slidably received in slots 10g formed in the left side member 10b of the tray structure 10. The pins 51a at one edge of the support plate 51 and the slots 14g in one of the movable members 13 and 14 are respectively aligned with the pins 51a at the other edge of the support plate 51 and the slots 14g in the other movable member in the direction of the arrow X. Each of the slots 10g is elongated in the direction of the arrow Z so that the support plate 51 is vertically movable with respect to the tray structure 10 over distances limited by the lengths of the slots 10g. The pins 51a on the support plate 51 extend through these slots 10g in the tray structure 10 and are further slidably received in cam holes 13g and 14g formed in the right and left movable members 13 and 14, respectively, the cam holes 13g in the movable member 14 being respectively aligned with the cam holes 14g in the movable member 14 each in the direction of the arrow X. These cam holes 13g and 14g are linearly inclined upwardly rearwardly, so that the support plate 51 carried on the movable members 13 and 14 by the pins 51a is to be guided to move upwardly when driven to move rearwardly with respect to the movable members 13 and 14 and accordingly to the turntable 45. Thus, the support plate 51 has an upper disc release position (shown in FIG. 3) with the pins 51a located at the uppermost and rearmost ends of the cam slots 13g and 14g as shown in FIGS. 4 and 5 and a lower disc clamp position with the pins 51a located at the lowermost and foremost ends of the cam slots 13g and 14g. The support plate 51 is vertically movable between these two positions with respect to the movable members 13 and 14 and accordingly to the turntable 45. In the description to follow, the previously mentioned stepping cam holes 13d and 14d in the movable members 13 and 14 will be referred to as first cam holes, while the cam straight inclined cam holes 13g and 14g thus formed additionally in the movable members 13 and 14 will be referred to as second cam holes. It may be noted in connection with these cam holes that all these first and second cam holes 13d, 14d, 13g and 14g have equal lengths each in the direction of the arrow Y.

On the support plate 51 is positioned a circular clamping member 52 which is positioned above and in alignment with the turntable 45 and which is rotatably mounted on the support plate 51 through an opening 51b (FIG. 3) formed in the support plate 51. The opening 51b is preferably generally elliptical in shape and, in this instance, the outside diameter of the disc clamping member 52 is smaller than the diameter of the major axis and larger than the diameter of the minor axis of the elliptical opening 51b in the support plate 51. The clamping member 52 has an upper disc portion positioned above a plane flush with the upper face of the support plate 51 and a lower annular portion positioned below a plane flush with the lower surface of the support plate 51. A circumferential groove 52c is thus formed between the upper disc portion and lower annular portion of the clamping member 52, which thus engages the support plate 51 through this groove 52c, as will be seen from FIG. 3. The clamping member 52 is thus slightly movable vertically with respect to the support plate 51 through the opening 51b. On the lower face of the upper disc portion of the clamping member 52 is attached an annular permanent magnet 52a which urges the clamping member 52 to have its upper disc portion attached to the upper face of the support plate 51 as shown in FIG. 3. For this purpose, each of the support plate 51 and clamping member 52 is constructed of magnetic metal such as steel. The upper face of the clamping member 52 is preferably lined with a soft web 52b of, for example, felt which protects the clamping member 52 from being brought into direct contact with the inner surface of the upper panel of the housing 2 when the support plate 51 held in the above mentioned upper disc release position is caused to move vertically by a shock transmitted thereto. Such a soft web may be provided, rather than on the clamping member 52, on the inner surface of the upper panel of the housing 2 in such a manner as to register with at least a portion of the upper face of the clamping member 52, though not shown in the drawings.

A pair of retainer plates 54 and 55 are positioned immediately below the support plate 51 as shown in FIG. 2. These retainer plates 54 and 55 are spaced apart from each other in the direction of the arrow X across the clamping member 52 and are retained to the support plate 51 by means of guide pins 54a and 55a projecting downwardly from the support plate 51, three of the pins being provided for each of the retainer plates 54 and 55.

The guide pins 54a and 55a engaging each of the retainer plates 54 and 55 are slidably received in slots 54g formed in each retainer plate and elongated each in the direction of the arrow X. The pins 54a and the elongated slots 54g of one retainer plate 54 are respectively aligned with the pins 55a and the elongated slots 55g of the other retainer plate 55, and each of the slots 54g and 55g terminates in an enlarged circular inner end portion. The pins 54a engaging the retainer plate 54 are located in symmetry with the pins 55a engaging the retainer plate 55 with respect to a center line which extends through the center axis of the clamping member 52 in the direction of the arrow Y. The retainer plates 54 and 55 have arcuate edge portions 54 shaped conformingly to and extending in and along the circumferential groove 52c in the clamping member 52 as will be seen from FIG. 2. Two or any suitable number of lugs project from the arcuate edge portion 54b or 55b of each of the retainer plates 54 and 55 and project into the circumferential groove 52c in the clamping member 52.

At the rear of the retainer plates 54 and 55 are provided a pair of synchronizer plates 57 and 58, respectively, which are also positioned immediately below the support plate 51 as shown in FIG. 2. These synchronizer plates 57 and 58 are pivotally coupled to the support plate 51 by means of vertically extending pivot pins 57a and 58a, respectively, and are thus rotatable independently of each other about these pins on a horizontal plane below the support plate 51. The pins 57a and 58a thus serving as pivot elements are located in symmetry with each other also with respect to a center line which extends through the center axis of the clamping member 52 in the direction of the arrow Y. The synchronizer plates 57 and 58 have inner side arm portions 57c and 58c extending toward each other away from the pins 57a and 58a, respectively, front arm portions 57d and 58d extending generally forwardly away from the pins 57a and 58a, respectively, and outer side arm portions 57e and 58e extending opposite to the inner side arm portions 57c and 58c, respectively, as shown. The inner side arm portion 58c of the right synchronizer plate 58 is formed with a slot 58f which is elongated in the direction of the arrow X and which is open at the extreme end of the arm portion 58c. On the other hand, the inner side arm portion 57c of the left synchronizer plate 58 has an end portion raised over and overlapping an end portion of the arm portion 58c of the synchronizer plate 58 as will be seen in FIG. 6. A pin 57f projects downwardly from this raised end portion of the arm portion 55c and is slidably received in the elongated slot 58f in the synchronizer plate 58, as indicated by broken lines in FIG. 2. The forwardly extending front arm portions 57d and 58d of the synchronizer plates 57 and 58 are also formed with slots 57g and 58g, respectively, which are open at the extreme ends of the arm portions 57d and 58d. The slots 57g and 58g in the synchronizer plates 57 and 58 are elongated each in the direction of the arrow Y as shown in FIG. 2 and have slidably received therein pins 54e and 55e projecting upwardly from the retainer plates 54 and 55, respectively. Thus, the synchronizer plates 57 and 58 are provided to allow the retainer plates 54 and 55 to move synchronously with each other with respect to the support plate 51.

In the description to follow, the combination of the right retainer and synchronizer plates 54 and 57 will be referred to as first position holding means 61 and, likewise, the combination of the left retainer and synchronizer plates 55 and 58 will be referred to as second position holding means 62. These pairing first and second position holding means 61 and 62 are positioned on a plane perpendicular to the axis of rotation of the clamping member 52 and engage the clamping member 52 at two or more points along the circumference of the clamping member 52 as by means of the lug portions 54c and 55c of the retainer plates 54 and 55. The first and second position holding means 61 and 62 are urged to have the lug portions 54c and 55c of the retainer plates 54 and 55 forced against the peripheral surface defining the radially inner end of the circumferential groove 52c in the clamping member 52. For this purpose, a helical tension spring 64 is anchored at one end to a front end portion of the retainer plate 54 and at the other to a front end portion of the retainer plate 55 as shown in FIG. 2, thus urging the retainer plates 54 and 55 toward each other in the direction of the arrow X. The first and second position holding means 61 and 62 and this tension spring 64 constitute in combination alignment means for maintaining the clamping member 52 in a predetermined position with respect to the support plate 51 in the embodiment shown. Furthermore, the combination of the alignment means, support plate 51 and clamping member 52 as well as the members and elements associated with these constitutes the disc clamp means adapted to have a disc 5 clamped onto the turntable 45 after the disc 5 has been conveyed to the predetermined position with respect to the turntable 45.

The above mentioned alignment means including the first and second position holding means 61 and 62 lends itself not only to the positioning of the clamping member 52 with respect to the support plate 51 but to positioning a disc 5 correctly on the disc transfer plate 22 after the disc 5 has been inserted into the automatic disc player through the slot 3a (FIG. 1) in the housing 2.

The first and second position holding means 61 and 62 are positioned on both sides of the path of a disc 5 to be transferred to the turntable 45 within the housing 2. Such position holding means 61 and 62 are movable on planes perpendicular to the plane on which the disc 5 is to be placed on the disc transfer plate 22 which forms part of the disc carrier means (which further comprises the tray structure 10 and the right and left movable members 13 and 14 as previously mentioned). On the lower face of the retainer plates 54 and 55 forming part of these first and second position holding means 61 and 62 are provided disc retaining pins 54f and 55f, respectively and on the lower face of the synchronizer plates 57 and 58 also forming part of the position holding means 61 and 62 are provided disc retaining pins 57h and 58h, respectively. The disc retaining pins 54f and 55f are located on outer side extensions protruding from front end portions of the retainer plates 54 and 55, respectively, and the disc retaining pins 57h and 58h are located on the previously mentioned outer side arm portions 57e and 58e of the synchronizer plates 57 and 58, respectively, as shown in FIG. 2. These disc retaining pins 54f, 55f, 57h and 58h extend in directions normal to the plane on which the disc 5 is to be placed on the disc transfer plate 22 and are used as disc retaining elements to engage the disc while the disc is being transferred to the turntable 45 within the housing 2. In this instance, the tension spring 64 provided between the retainer plates 54 and 55 serves to urge these disc retaining pins 54f, 55f, 57h and 58h to engage the edge of the disc being moved inwardly in the housing 2. Each of the disc retaining pins 54f, 55f, 57h and 58h is tapered toward its lower end as shown in FIG. 6. When the disc 5 is being loaded into the automatic disc player or being withdrawn therefrom, the disc 5 is retained by these pins 54f, 55f, 57h and 58h and is urged to move downwardly toward the upper face of the disc transfer plate 22 due to the downward forces which result from the tapered surfaces of the pins.

The automatic disc player embodying the present invention further comprises disc releasing means adapted to have a disc 5 released from the hereinbefore described alignment means.

As shown in FIGS. 2 and 6, the disc releasing means comprises a relatively small-sized bracket member 71 having a generally L-shaped cross section. The bracket member 71 forms part of or is securely connected to the left movable member 14 and projects rightwardly from the upper end of the movable member 14. A pin 72 projects downwardly from this bracket member 71 and, in association with this pin 72, there is provided a pawl member 73 which is secured to the outer side arm portion 58e of the left synchronizer plate 58 by means of, for example, screws as shown in FIG. 2. The pin 72 and the pawl member 73 are located so that the former is to be brought into engagement with the latter at the front end of the latter when the tray structure 10 movable with the disc transfer plate 22 assumes the previously mentioned predetermined -position in which the disc 5 placed on the transfer plate 22 has its center axis substantially aligned with the axis of rotation of the turntable 45. As the movable members 13 and 14 are moved rearwardly after the tray structure 10 has reached this position with respect to the turntable 45, the pin 72 on the movable member 14 presses the pawl member 73 rearwardly and causes the left synchronizer plate 58 to turn clockwise in FIG. 2 about the axis of the pivot pin 58a with respect to the support plate 51. The turning motion of the synchronizer plate 58 is transmitted on one hand through the inner side arm portion 58c of the plate 58 to the inner side arm portion 57c of the right synchronizer plate 57 through the pin 57f on the arm portion 57c and causes the synchronizer plate 57 to turn counter clockwise in FIG. 2 about the axis of the pivot pin 57a with respect to the support plate 51. As a result of the clockwise and counter clockwise turn of the synchronizer plates 57 and 58, the pins 57h and 58h on the outer side arm portions 57e and 58e of the plates 57 and 58 are caused to move rearwardly with respect to the disc transfer plate 22 and are thus disengaged from the disc 5 placed on the transfer plate 22. The turning motion of the synchronizer plate 58 is on the other hand transmitted through the front arm portion 58d of the plate 58 to the left retainer plate 55 through the pin 55e on the plate 55 and causes the retainer plate 55 to move outwardly in the direction of the arrow X with respect to the support plate 51. The turning motion of the right synchronizer plate 57 in turn is transmitted through the front arm portion 57d of the plate 57 to the right retainer plate 54 through the pin 54e on the plate 54 and also causes the retainer plate 54 to move outwardly in the direction of the arrow X with respect to the support plate 51. The right and left retainer plates 54 and 55 respectively forming part of the first and second position holding means 61 and 62 are thus caused to move way from each other in the direction of the arrow X against the force of the tension spring 64 as the movable members 13 and 14 are moved rearwardly after the tray structure 10 has reached the predetermined position with respect to the turntable 45. The retainer plates 54 and 55 being thus moved away from each other, the pins 54f and 55f thereon are also moved away from each other and are in the result disengaged from the disc 5 on the disc transfer plate 22. The disc 5 on the disc transfer plate 22 is in this fashion released from the pins 54f, 55f, 57h and 58h forming part of the first and second position holding means 61 and 62.

The pin 72 on the movable member 14 is tapered downwardly, viz., in a direction in which the disc transfer plate 22 is to move toward the turntable 45, as will be seen from FIG. 6. The pawl member 73 fastened to the synchronizer plate 58 is thus allowed to engage the pin 72 by an edge-to-point contact with the pin 72 and produces a minimum of frictional force between the pin 72 and the pawl member 73 when the pawl member 73 is being moved by the pin 72. This provides smooth and unresisted movement of the retainer plates 54 and 55 and synchronizer plates 57 and 58 during loading and unloading of the disc 5. The tapered configuration of the pin 72 will further contribute to imparting a thrust to the synchronizer plate 58 being turned clockwise.

The automatic disc player embodying the present invention further comprises antistatic brush means to remove static charges from the disc 5 to be loaded into the player through the slot 3a in the housing 2.

Figure 13:
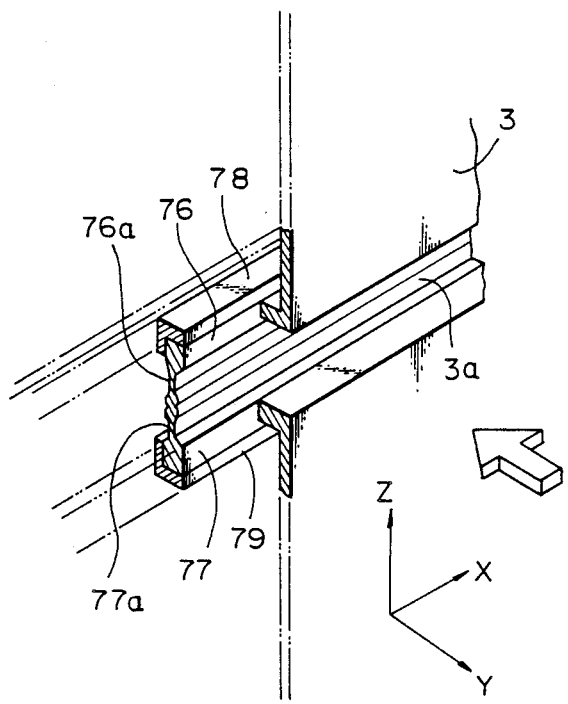
FIG. 13 is a partially cutaway view showing the arrangement of double loading preventive means included in the automatic disc player embodying the present invention.

Such antistatic brush means comprises a pair of, upper and lower, strips 76 and 77 which are disposed immediately inside the horizontally elongated slot 3a in the front panel 3 of the housing 2 as shown in FIG. 13 of the drawings. These strips 76 and 77 are formed of an electrically conductive, resilient material such as carbon-dispersed rubber. The resilient strips 76 and 77 extend along the slot 3a throughout the length of the slot 3a and have their upper and lower end portions bonded to or otherwise securely attached to fixtures 78 and 79, respectively, extending along the strips 76 and 77. The fixtures 78 and 79 are secured to the inner face of the front panel 3 of the housing 2 so that the resilient strips 76 and 77 are held in position with respect to the slot 3a. Each of the fixtures 78 and 79 is also formed of an electrically conductive material and is grounded through an appropriate conductor (not shown). The resilient strips 76 and 77 have lower and upper end portions which are either held in contact with or slightly spaced apart from each other at the rear of the slot 3a and are resiliently deformable toward and away from the slot 3a. The disc 5 inserted through the slot 3a into the housing 2 can thus be passed between the lower and upper ends of the strips 76 and 77 so that the static charges which may have been deposited on the surfaces of the disc can be transferred to the strips 76 and 77 and ultimately to ground. The dust which may have been deposited on the disc 5 to be loaded into the automatic disc player can thus be precluded from being admitted into the automatic disc player. Each of the strips 76 and 77 is preferably thinned between the upper and lower end portions thereof as indicated at 76a and 77a to provide an increased degree of resiliency. Also preferably, each of the respective lower and upper end portions of the strips 76 and 77 is shaped to have a rounded cross section as shown, to provide smoothness of passage of the disc 5 between the strips.

The automatic disc player embodying the present invention further comprises means for preventing loading of two or more discs into the automatic disc player. Such double loading preventive means comprises a bell-crank lever 85 attached to the inner face of the bracket member 12 secured to the chassis structure 7, as shown in FIGS. 2, 5 and 6. The lever 85 thus intervening between the bracket member 12 and the right movable member 13 extends generally in the direction of the arrow Y and is pivotally mounted on the bracket member 12 by means of a pivot pin 85a extending in the direction of the arrow X. The lever 85 is caused to turn clockwise in FIG. 5 about the pivot pin 85a as the movable member 13 moves rearwardly to load a disc 5 into the automatic disc player. In front of the lever 85 is positioned a slot closing member 86 having a generally J-shaped cross section and movable upwardly and downwardly with respect to the chassis structure 7 along an appropriate guide member (not shown) attached to, for example, the housing 2. The slot closing member 86 has a pin 86a projecting rightwardly from a lower portion of the member 86. The pin 86 is slidably received in an open-ended slot 85b formed in a front arm portion of the bell-crank lever 85 and elongated generally in the direction of the arrow Y. The slot closing member 86 is movable upwardly from and downwardly back to a predetermined vertical position shown in FIG. 5 as the bell-crank lever 85 is caused to turn clockwise and counter clockwise in FIG. 5. When the slot closing member 86 is held in this position, the front lug portion of the slot closing member 86 is located below a plane flush with the lower end of the slot 3a in the housing 2 as will be seen from FIG. 5. When the movable member 13 is moved rearwardly with respect to the housing 2 during loading of a disc 5, the bell-crank lever 85 is driven to turn clockwise in FIG. 5 about the pivot pin 85a. This causes the slot closing member 86 to move upwardly from the above mentioned vertical position thereof to a position having its front lug portion located at the rear of the slot 3a, thus forming an obstacle to entry of another disc into the automatic disc player through the slot 3a. The double loading preventing means is thus driven by the movement of the movable member 13 and, accordingly, uses no extra drive means proper to such means.

The automatic disc player embodying the present invention further comprises disc guide means for guiding the movement of the disc 5 from the slot 3a to the disc transfer plate 22. Such guide means comprises a guide member 91 located on the path of the disc 5 from the slot 3a to the disc transfer plate 22, viz., at the rear of the disc transfer plate 22 and is securely attached to, for example, the base member 10a of the tray structure 10 by means of, for example, studs as shown in views (A) and (C) of FIG. 14. The guide member 91 is spaced apart from the lower face of the base member 10a and has a front end portion inclined upwardly in forward direction as will be best seen in view (C) of FIG. 14. The disc 5 which has been inserted into the housing 2 through the slot 3a in the front panel 3 and which is being moved deeper into the housing 2 is brought into sliding contact at its leading end with the lower surface of the inclined front end portion of the guide member 91 and is thus enabled to correctly reach the predetermined position on the disc transfer plate 22. The guide member 91 is formed with a circular opening aligned with the opening 10d in the tray structure 10 for providing an unobstructed access to the objective lens 33 in the carriage assembly 33 (FIGS. 8 and 9).

When a disc 5 is placed correctly on the disc transfer plate 22, the disc 5 has its leading end located below a rear end portion of the base member 10a of the tray structure 10. A playback re-start switch unit 93 is provided below this rear end portion of the tray structure 10 as shown in views (A), (B) and (C) of FIG. 14 and is secured to the base member 10a of the tray structure 10 by means of, for example, a screw as shown in FIG. 6. This playback re-start switch unit 93 is arranged to be actuated when the disc placed on the disc transfer plate 22 is moved slightly rearwardly beyond the predetermined position on the transfer plate 22. The re-start switch unit 93 is engageable with the edge of the disc 5 at the leading end of the disc through an actuating member 94 which has a portion located in front of the switch unit 93 and movable in the direction of the arrow Y, the portion of the member 94 being biased forwardly. As will be understood more clearly as the description proceeds, the playback re-start switch unit 93 is to be actuated when the disc 5 which has once been played back is to be used for a second time without withdrawing the disc from the automatic disc player. The switch unit 93 thus forms part of a suitable driver circuit connected to the coil unit of the main drive motor 20.

The automatic disc player embodying the present invention further comprises mechanical detecting means responsive to the movements of the disc 5 and the tray structure 10 and operative to indicate that the disc 5 is positioned correctly on the disc transfer plate 22. In the embodiment herein shown, such detecting means comprises a pivot rod 96 projecting downwardly from the lower face of a left end portion of the base member 10a of the tray structure 10 as shown in FIG. 6. A bell-crank lever 97 is pivotally mounted on this pivot rod 96 and has two arm portions extending in opposite directions away from the pivot rod 96 as also shown in views (A), (B) and (C) of FIG. 15. Pins 97a and 97b project downwardly from these opposite arm portions, respectively, of the bell-crank lever 97. The pin 97a projecting from one arm portion is located to be engageable with the edge of the disc 5 correctly placed on the disc transfer plate 22 as shown in view (B) of FIG. 15. This arm portion of the lever 97 is per se engageable with an actuator element projecting from a disc position detector switch unit 98 which is supported on a switch support member 99 which is also pivotally mounted on the pivot rod 96. The bell-crank lever 97 is thus operative to press the actuator element of the switch unit 98 when turned counter clockwise in FIG. 15 about the center axis of the pivot rod 96 as shown in views (B) and (C) of FIG. 15. The switch support member 99 is urged to turn clockwise in the drawings (FIGS. 2 and 15) about the axis of the pivot rod 96 by means of appropriate biasing means such as a helical tension spring (not shown) anchored at one end to the support member 99 and at the other to, for example, the tray structure 10. This biasing means is also effective to urge the lever 97 to turn clockwise in the drawings about the axis of the pivot rod 96. The chassis structure 7 has a lug portion 7f upstanding from the left end of the main chassis member 7a and located in the vicinity of the rear end of the chassis member 7a as shown in FIG. 6. The pin 97b projecting from the other arm portion of the bell-crank lever 97 is located to be engageable with this lug portion 7f of the chassis structure 7 as shown in view (C) of FIG. 15 when the tray structure 10 is moved to a predetermined position with respect to the chassis structure 7 from, for example, the position illustrated in FIG. 2. The disc position detector switch unit 98 is adapted to close when a disc 5 is correctly placed on the disc transfer plate 22 and is electrically connected to the main drive motor 20 through an appropriate control circuit (not shown).

As shown in FIGS. 6 and 10, the support structure 28 supporting the previously described carriage assembly 34 has a position detector switch unit 101 mounted on the left side portion thereof. The detector switch unit 101 is responsive to backward movement of the carriage assembly 34 on the support structure 28 and has an actuator element 101a engageable with a projection 31e on the slider 31 movably mounted on the support structure 28. The actuator element 101a and the projection 31e are located so that the projection 31e is brought into pressing engagement with the actuator element 101a when the carriage assembly 34 being moved forwardly of the support structure 28 reaches a predetermined home position with respect to the housing 2. The position detector switch unit 101 is thus operative to produce a signal indicating that the carriage assembly 34 has been moved back to the home position at the end of each playback operation.

In association with the tray structure 10 is provided a position detector switch unit 103 which is responsive to the movement of the tray structure 10 with respect to the chassis structure 7. The detector switch unit 103 is mounted on the left side wall portion of the chassis structure 7 as shown in FIG. 4. The detector switch unit 103 has an actuator element engageable with a portion of the tray structure 10 when the tray structure 10 is in a predetermined rearmost limit position on the chassis structure 7. At the rear of this position detector switch unit 103 is provided a position detector switch unit 104 which is responsive to the movement of the left movable member 14 with respect to the chassis structure 7. The position detector switch unit 104 is mounted on the left side wall portion of the chassis structure 7 by means of a bracket member 105 as shown in FIGS. 4 and 6. The detector switch unit 104 has an actuator element engageable with a portion of the movable member 14 when the movable member 14 is moved to a predetermined rearmost limit position with respect to the chassis structure 7. The position detector switch unit 104 is thus operative to produce a signal indicating the loading of a disc into the automatic disc player and the clamping of the disc on the turntable 45 are complete.

The above described playback re-start switch unit 93 and the various detector switch units 98, 101, 103 and 104 as well as the control buttons 6 shown in FIG. 1 are all electrically connected to a control module provided within the housing 2, though not shown in the drawings. The various drive means such as the motors 20, 38 and 46 as hereinbefore described are started and shut off at timings dictated by signals supplied from this control module.

Description will now be made with concurrent reference to FIGS. 1 to 18 regarding the operation of the automatic disc player constructed as hereinbefore described.

Operation of the automatic disc player starts with manual insertion of a disc 5 into the housing 2 through the slot 3a in the front panel 3 of the housing 2. While the disc 5 is being inserted through the slot 3a, the disc is passed between the resilient strips 76 and 77 (FIG. 13) behind the slot 3a and is cleared of static charges which may have been deposited on the surfaces of the disc. The disc 5 thus inserted through the horizontally elongated slot 3a is first brought into engagement at its leading edge portion with the disc retaining pins 54f and 55f on the retainer plates 54 and 55 forming part of the first and second position holding means 61 and 62, respectively. As the disc 5 is moved forwardly through the slot 3a, the disc forces the pins 54f and 55f to move away from each other in the direction of the arrow X. It therefore follows that the retainer plates 54 and 55 are caused to move away from each other with respect to the support plate 51 against the force of the tension spring 64. This causes the synchronizer plates 57 and 58 to turn clockwise and counter clockwise in FIG. 2 about the center axes of the pivot pins 57a and 58a, respectively. After the center axis of the disc 5 thus travelling forwardly is moved past the line joining the center axes of the pins 54f and 55f, the pins 54f and 55f are allowed to move toward each other so that the disc 5 is urged to move forwardly by the force of the spring 64 which acts on the retainer plates 54 and 55 and can therefore be moved forwardly if the disc 5 is released from the operator's hand. As the retainer plates 54 and 55 are thus moved toward each other with respect to the support plate 51 by the force of the tension spring 64, the synchronizer plates 57 and 58 are caused to turn in counter clockwise and clockwise directions, respectively, in FIG. 2 toward their initial positions with respect to the support plate 51. The disc 5 admitted into the housing 2 is moved under the guidance of the guide member 91 located at the rear end of the tray structure 10 until the disc 5 reaches the proper position on the disc transfer plate 22 which at this stage is still held at rest together with the tray structure 10 and the movable members 13 and 14. The disc 5 thus positioned correctly on the disc transfer plate 22 is retained in this position by the disc retaining pins 54f and 55f on the retainer plates 54 and 55 and the disc retaining pins pins 57h and 58h on the synchronizer plates 57 and 58. In this fashion, the disc 5 can be maintained in the correct position on the disc transfer plate 22 if any shocks or vibrations are transferred to the housing 2 as where the automatic disc player is installed on a motor vehicle.

Figure 15A:
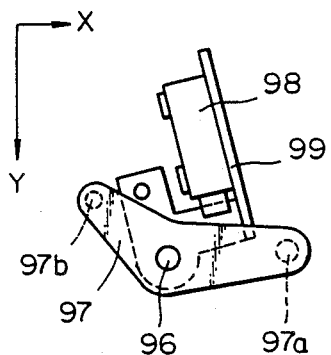
FIGS. 15A–C show the arrangement of a disc position detector switch unit further included in the automatic disc player embodying the present invention, wherein (A), (B) and (C) are views showing different conditions of the arrangement.
Figure 15B:
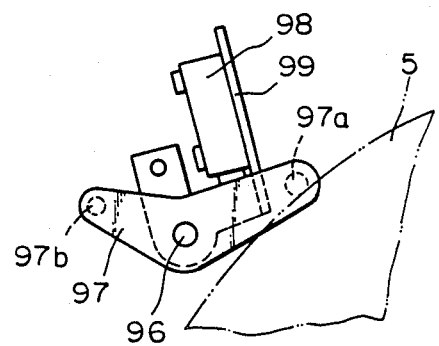
Figure 15C:
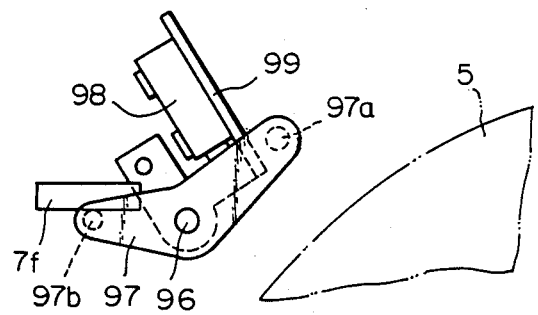

When the disc 5 is positioned on the disc transfer plate 22, the disc has its leading edge portion brought into engagement with the pin 97a on the bell-crank lever 97 as shown in view (B) of FIG. 15. This causes the lever 97 to turn counter clockwise about the axis of the pivot rod 96 against the force of the associated spring (not shown) and accordingly brings the arm portion supporting the pin 97a into pressing engagement with the actuator element of the switch unit 98, causing the switch unit 98 to close. In response to an output signal accordingly supplied from the switch unit 98, the main drive motor 20 is actuated to start and drives the left movable member 14 for rearward movement with respect to the chassis structure 7. In this instance, the power output of the motor 20 is transmitted through the reduction gear unit 19 (FIG. 4) to the rack member 14c integral with or secured to the movable member 14 and causes the movable member 14 to move rearwardly with respect to the chassis structure 7. Under these conditions, the locking pin 26 on the lever 25 forming part of the lock/unlock means is received in the cam slot 14e in the movable member 14 so that the movable member 14 and accordingly the disc transfer plate 22 are held against movement with respect to the tray structure 10. Thus, the movable members 13 and 14, tray structure 10 and disc transfer plate 22 are moved rearwardly as a single unit with respect to the chassis structure 7 by the power output from the main drive motor 20. While these members and structure are being thus moved with respect to the chassis structure 7, the locking pin 26 slides on the upper face of the chassis structure 7 along the left edge of the structure 7.

As the unit of the movable members 13 and 14, tray structure 10 and disc transfer plate 22 is rearwardly moved a predetermined distance from its initial position within the housing 2, the disc 5 on the transfer plate 22 is almost in its entirety admitted into the housing 2. Approximately at this point of time, the pin 97b on the bell-crank lever 97 (FIG. 15) is brought into abutting engagement with the upstanding lug portion 7f of the chassis structure 7 as shown in view (C) of FIG. 15. The bell-crank lever 97 is therefore forcibly held in the angular position pressing the actuator element of the disc position detector switch unit 98, allowing the main drive motor 20 to drive the movable member 14 for further rearward movement with respect to the chassis structure 7. The further rearward movement of the movable member 14 causes the bell-crank lever 97 to turn counter clockwise about the axis of the pivot rod 96 against the force of the associated spring, with the result that the arm portion of the lever 97 carrying the pin 97a is disengaged from the disc 5 on the disc transfer plate 22, as shown in view (C) of FIG. 15. The disc 5 placed on the disc transfer plate 22 now reaches a position having its center axis substantially aligned with the axis of rotation of the turntable 45 positioned below the transfer plate 22.

Figure 16:
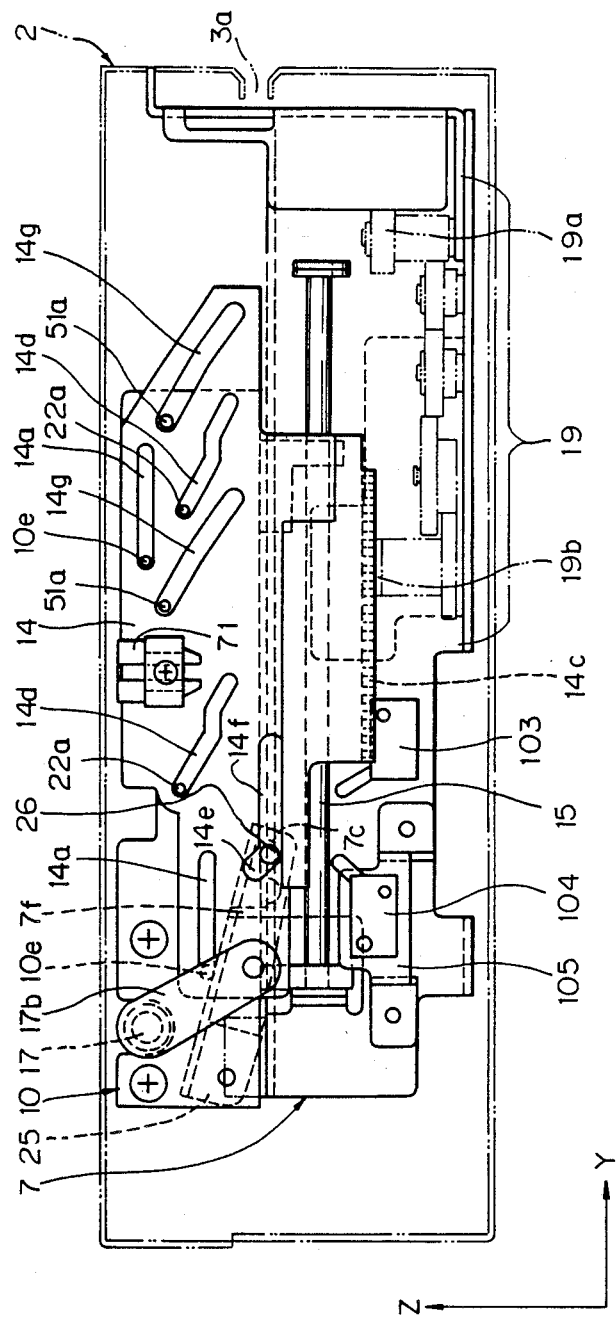
FIGS. 16 and 17 are views similar to FIG. 4 but show conditions of the automatic disc player different from those of the automatic disc player shown in FIG. 4.

Simultaneously as the disc 5 is released from the bell-crank lever 97, the locking pin 26 on the lever 25 is withdrawn from the cam slot 14e and enters the elongated slot 14f in the movable member 14 as shown in FIG. 16 of the drawings. As the pin 26 is thus admitted into the elongated slot 14e, it is also received in the cutout 7c in the chassis structure 7 so that the tray structure 10 is locked to the chassis structure 7 and accordingly to the housing 2 by means of the locking pin 26. With the locking pin 26 being located in the elongated slot 14f in the movable member 14, the movable member 14 is now allowed to move further rearwardly with respect to the tray structure 10 and the disc transfer plate 22 allowed to move vertically with respect to the tray structure 10. It therefore follows that the movable members 13 and 14 alone are permitted to further move rearwardly with respect to the housing 2 until the movable members 13 and 14 ultimately reaches the positions represented by the position of the member 14 in FIG. 17. As the movable members 13 and 14 are thus moved rearwardly with respect to the tray structure 10 and accordingly to the disc transfer plate 22, the disc transfer plate 22 is caused to move downwardly with respect to the chassis structure 10 with its guide pins 22a moved stepwise downwardly in the stepping cam holes 13d and 14d and its guide pins 22a' moved stepwise downwardly in the stepping cam holes 13d' and 14d' in the movable members 13 and 14, respectively. With the disc transfer plate 22 thus moved downwardly with respect to the tray structure 10 and accordingly to the turntable 45, the disc 5 on the transfer plate 22 is landed on the turntable 45 when or at least by the time the pins 22a and 22a' reach the foremost and lowermost ends of the stepping cam holes 13d, 14d, 13d' and 14d' in the movable members 13 and 14 as shown in FIG. 17.

Figure 18:
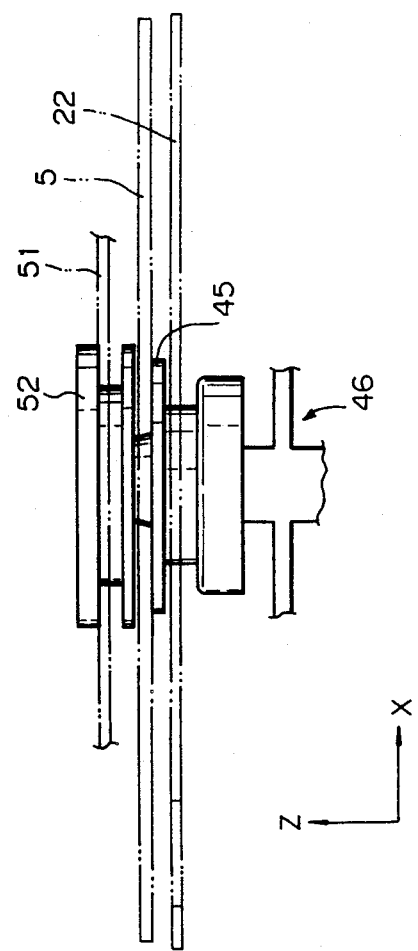
FIG. 18 is a schematic elevation view showing the arrangement of the turntable and the disc clamp means which form part of the automatic disc player embodying the present invention.

With the movement of the movable members 13 and 14 with respect to the tray structure 10, furthermore, the guide pins 51a of the support plate 51 forming part of the disc clamp means are caused to lower along the slots 13g and 14g in the movable members 13 and 14, respectively, as will be also seen from FIG. 17. It therefore follows that the support plate 51 and accordingly the clamping member 52 carried thereon are caused to move downwardly until the clamping member 52 has its lower annular portion received on the disc 5 on the turntable 45 as shown in FIG. 18 of the drawings. The distance of movement of the support plate 51 between its uppermost position (which corresponds to the locations of the rearmost and uppermost ends of the slots 13d and 14d) and the position thus seated on the disc 5 on the turntable 45 (which position largely corresponds to the locations of the foremost and lowermost ends of the slots 13d and 14d) is selected to be, for example, about 8.5 mm. In this instance, the distance of movement of the disc transfer plate 22 between its uppermost position with respect to the turntable 45 (which position corresponds to the locations of the rearmost and uppermost ends of the holes 13d, 14d, 13d' and 14d') and its lowermost position (which corresponds to the locations of the foremost and lowermost ends of the holes 13d, 14d, 13d' and 14d') is selected to be about 6.5 mm. The difference of about 2 mm between the distance of movement of the disc transfer plate 22 and that of the support plate 51 results from the existence of the horizontal intermediate portions of the stepping cam holes 13d, 14d, 13d' and 14d' along which the disc transfer plate 22 is to be moved.

Simultaneously as the disc 5 is clamped between the turntable 45 and the clamp member 52, the movable members 13 and 14 reach their rearmost limit positions with respect to the housing 2. When the movable member 14 is moved to such a position, it is brought into pressing engagement with the actuator element of the position detector switch unit 104 as shown in FIG. 17 and causes the switch unit 104 to close. A control signal is supplied from the previously mentioned control module to the main drive motor 20, which is accordingly brought to a stop. The automatic disc player is now ready for playback operation. It may be noted that the backward movement of the right movable member 13 causes the lever 85 of the double loading preventive means (FIG. 5) to turn clockwise in FIG. 5 so that the slot closing member 86 engaging the lever 85 is raised and located immediately at the rear of the slot 3a in the housing 2, thereby preventing loading of another disc into the housing 2.

When the playback start button 6a out of the control buttons 6 (FIG. 1) on the housing 2 is depressed manually, the spindle drive motor 46 and the motor 38 for driving the carriage assembly 34 are actuated to start and the automatic disc player starts the playback operation with the disc 5 carried on the turntable 45. When the carriage assembly 34 reaches a predetermined limit position with respect to the support structure 28, the motors 38 and 46 are brought to a stop so that the turntable 45 stops rotation and the carriage assembly 34 stops movement along the screw shaft 37. The main drive motor 20 is now actuated to start rotation in the opposite direction, driving the tray structure 10, movable members 13 and 14, disc transfer plate 22 and disc clamping member 52 for movement through a reversal of the motions hereinbefore described. These members and units are thus returned to their respective initial positions in the housing 2 and the carriage assembly 34 is moved back to the initial home position thereof with the motor 38 also actuated to start rotation in the opposite direction. The disc 5 which has been played back is in this manner conveyed backwardly in the housing 2 and is withdrawn out of the housing 2 through the slot 3a. If it is desired that the disc 5 which has once been played back be played back for a second time, the playback re-start switch unit 93 is closed when the disc is manually pressed rearwardly while it remains on the turntable 45.

Figure 19:
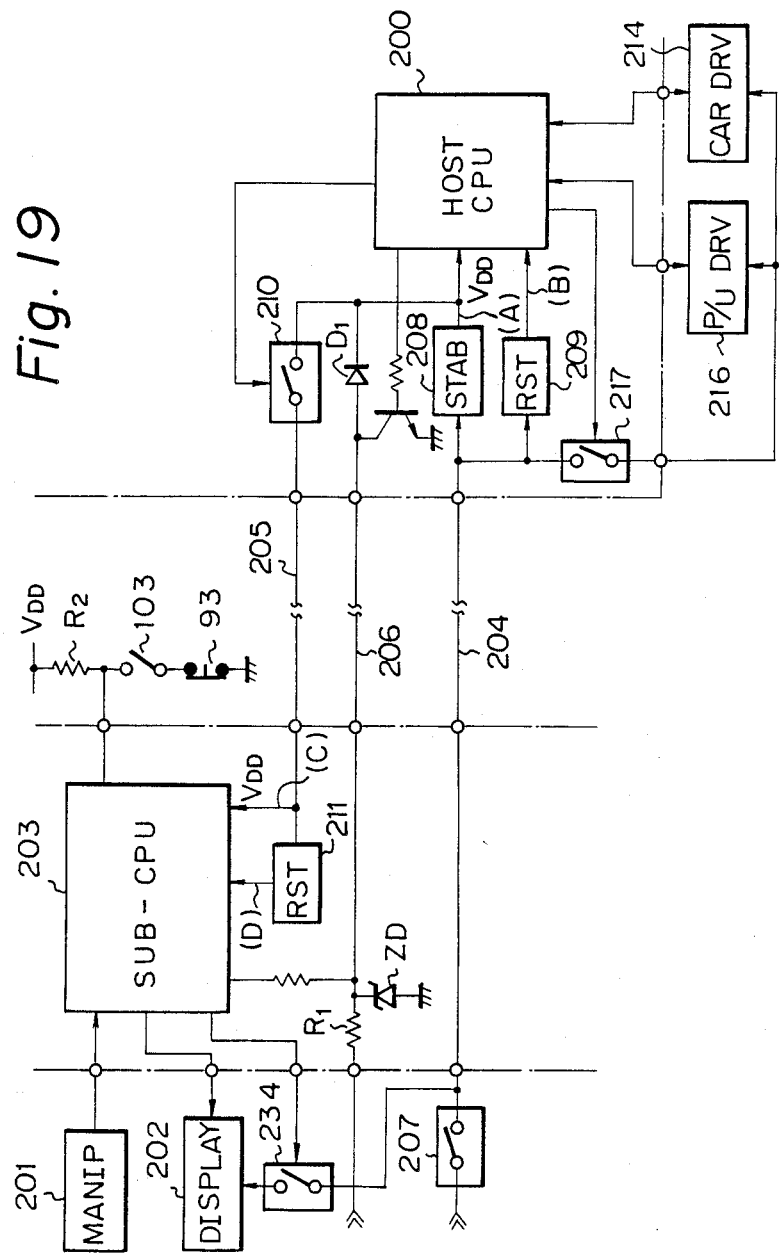
FIG. 19 is a block diagram showing part of the general circuit arrangement of a control circuit forming part of the disc player embodying the present invention.

FIG. 19 shows the circuit arrangement of a preferred example of the previously mentioned control circuit incorporated in the housing 2 (FIG. 1).

The control circuit includes a host microprocessor 200 (labelled as HOST CPU) which constitutes a first control section predominant over the operation of the system as a whole and a submicroprocessor 203 (labelled as SUB-CPU) which constitutes a second control section predominant over the operations of sections including manipulative means 201 (labelled as MANIP) and display means 202 (labelled as DIS-PLAY). These two microprocessors 200 and 203 are implemented, for example, on independent chips and are connected to each other via lines such as a main power supply line 204, a constant-voltage power line 205 and a communications line 206. While the main power source is shown connected to the host microprocessor 200 through the submicroprocessor 203, it may be connected directly to the former if desired, though not shown in the drawings. Where the disc player embodying the present invention is installed on a motor vehicle, the main power source may be provided by the battery used on the vehicle and may be connected to the control circuit of FIG. 19 across an accessory switch 207 as shown. The main power source voltage is stabilized by a stabilizer network 208 (labelled as STAB) connected across the switch 207 to the main power source and having an output terminal connected to the host microprocessor 200.

Figure 20:
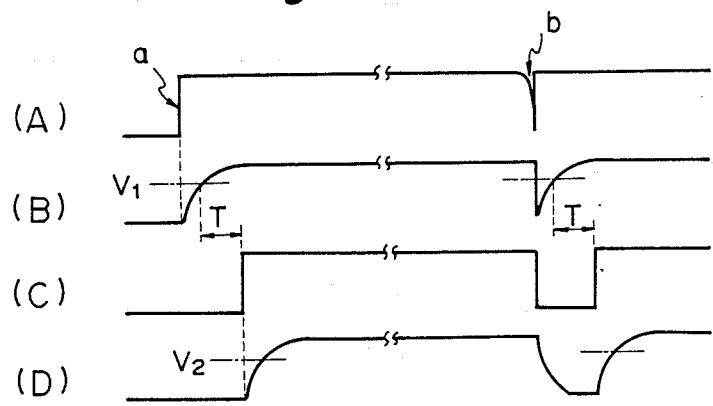
FIG. 20 shows timecharts respectively indicating examples of waveforms which may appear at locations (A), (B), (C) and (D) in the control circuit shown in FIG. 19.
Figure 21:
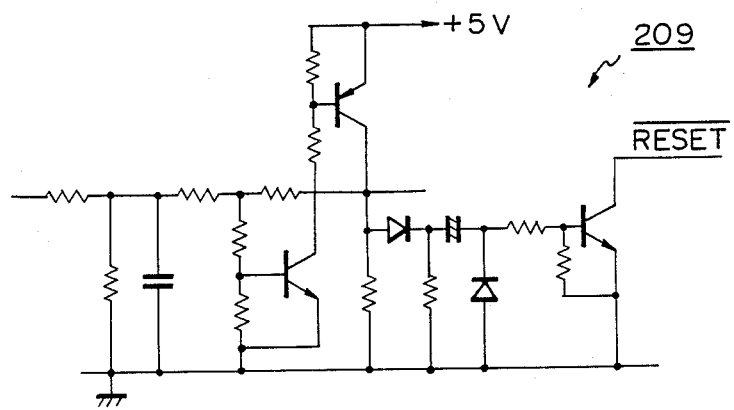
FIG. 21 is a diagram showing an example of the circuit arrangement of the reset network included in the control circuit illustrated in FIG. 19.
Figure 22:
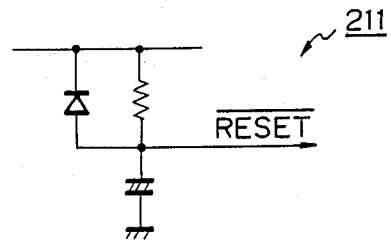
FIG. 22 is view similar to FIG. 21 but shows another yet more preferred example of the circuit arrangement of the reset network included in the control circuit illustrated in FIG. 19.

When the switch 207 is manually closed by, for example, the vehicle driver, the source voltage $V_{DD}$ stabilized by the stabilizer network 208 rises steeply to a high level as indicated at a in timechart (A) of FIG. 20. In parallel with this stabilizer network 208 is provided a main reset circuit 209 (labelled as RST) which is also connected across the switch 207 to the main power source. With the switch 207 closed, the main reset circuit 209 supplies to the host microprocessor 200 a signal voltage which rises gradually in accordance with a predetermined time constant and causes the host microprocessor 200 to reset at the point of time when the signal voltage reaches a predetermined level $V_1$ as shown in timechart (B) of FIG. 20. The microprocessor 200 starts to produce a control signal upon lapse of a predetermined period of time T after the host microprocessor 200 is thus reset. The control signal thus produced by the host microprocessor 200 is supplied to the control terminal of a switch element 210 connected to the power source line between the microprocessors 200 and 203 and causes the switch element 210 turn on. This provides connection between the submicroprocessor 203 and the main power source through the stabilizer network 208 so that the stabilized main power source voltage $V_{DD}$ being produced by the stabilizer network 208 is supplied not only to the host microprocessor 200 but also to the submicroprocessor 203 via the switch element 210 at the end of the above mentioned time duration T. It therefore follows that the potential on the main power supply line leading from the switch element 210 directly to the submicroprocessor 203 turns to a high level as shown in timechart (C) of FIG. 20. The switch element 210 is further connected to the submicroprocessor 203 through an auxiliary reset circuit 211 (RST). The auxiliary reset circuit 211 is thus also supplied with the output voltage $V_{DD}$ of the high level from the stabilizer network 208 through the switch element 210 and produces an output voltage which rises gradually in accordance with a predetermined time constant. The submicroprocessor 203 is reset at the point of time when the output voltage from the auxiliary reset circuit 211 reaches a predetermined level $V_2$, as indicated in timechart (D) of FIG. 20. By controlling the source voltage for the submicroprocessor 203 by the host microprocessor 200 in this fashion, the microprocessor 200 and submicroprocessor 203 are enabled to operate synchronously with each other without use of extra lines tailored to establishment of synchronization between the two microprocessors 200 and 203. Provision of such extra lines would result in the wiring arrangement of the control module and would give rise to an increase in the process time of the circuit. If arrangements were made so that the microprocessors 200 and 203 synchronize with the rise of the main power source voltage independently of each other, then each of the microprocessors would require a reset network of extremely intricate configuration, an example of such a network being shown in FIG. 21. By controlling the source voltage for the submicroprocessor 203 by the host microprocessor 200 as in the control circuit of FIG. 19, the reset circuit 211 for the submicroprocessor 203 can be of an extremely simple configuration as shown in FIG. 22 and will contribute to simplification of the control circuit as a whole.

It may be noted that the reset circuit 209 is capable of detecting an instantaneous break of the source voltage $V_{DD}$. When the source voltage $V_{DD}$ happens to interrupt instantaneously as indicated at b in timechart (A) of FIG. 20, the host microprocessor 200 and the submicroprocessor 203 are reset at predetermined timings as will be seen from timecharts (B) and (C) of FIG. 20 and are thus permitted to maintain synchronization therebetween.

Figure 23:
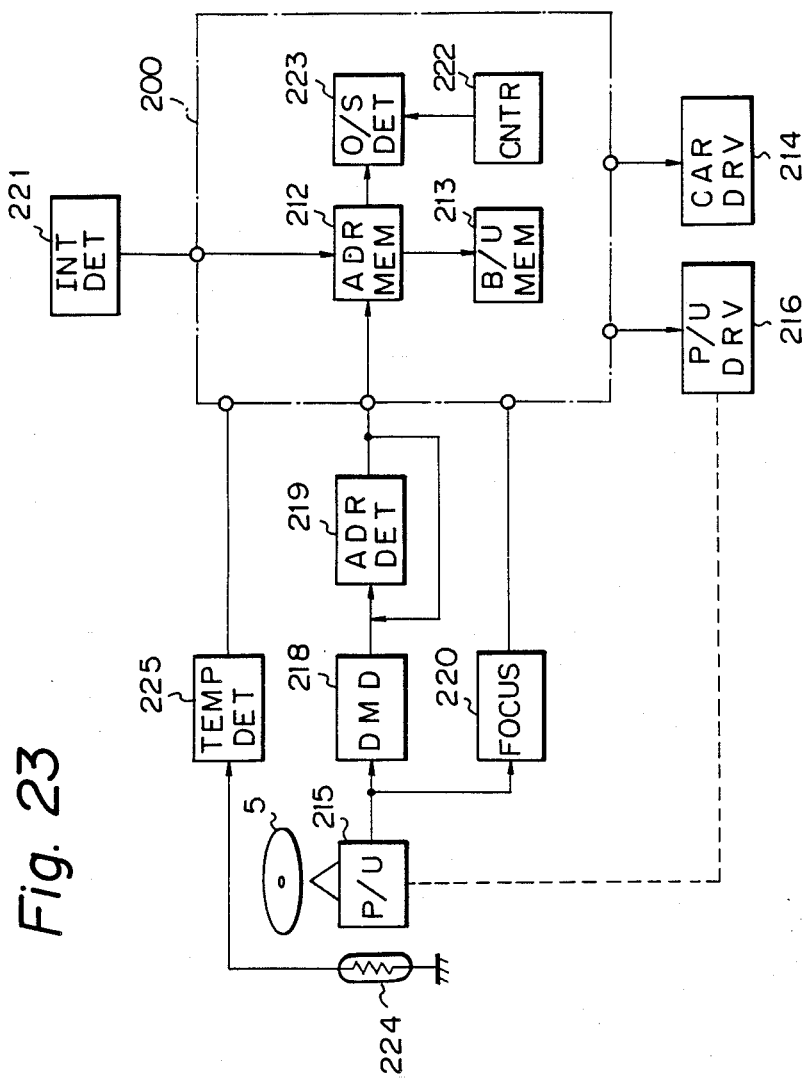
FIG. 23 is a block diagram showing another part of the control circuit forming part of the disc player embodying the present invention.

As illustrated in FIG. 23 of the drawings, the host microprocessor 200 has incorporated therein an address memory 212 (labelled as ADR MEM) and a backup memory 213 (labelled as B/U MEM). In the event the supply of the main source power is interrupted, a backup power is supplied from the submicroprocessor 203 to the backup memory 213. The backup power is made to have a constant voltage by means of a constant voltage network shown consisting of a Zener diode ZD and a resistor $R_1$ in FIG. 19 and is supplied to a power terminal of the host microprocessor 200 through the communications line 206 and by way of a diode $D_1$.

The playback re-start switch unit 93 previously described with reference to FIGS. 2, 6 and 14 is in FIG. 19 shown as being of the normally-closed design and is connected in series with the position detector switch unit 103 which is responsive to the movement of the tray structure 10 (FIG. 2) to the foremost limit position thereof, viz., the movement of the disc 5 to a position ready to be withdrawn from the housing 2. The series combination of these switch units 93 and 103 is connected at one end to an input port of the submicroprocessor 203 and through a resistor $R_2$ to the source of the voltage $V_{DD}$ and is grounded at the other as shown in FIG. 19. When the disc 5 is conveyed to the position ready to be withdrawn from the housing 2 upon termination of a playback operation with the disc, the position detector switch unit 103 is caused to close so that a voltage of a low level appears at the input of the submicroprocessor 203 with the playback re-start switch unit 93 maintained closed. If a manipulative effort is applied to the disc 5 moved to the position ready to be withdrawn from the housing 2 and the disc is thus caused to slightly move deeper into the housing 2, the playback re-start switch unit 93 is caused to close as previously described. The playback re-start switch unit 93 being open, the potential at the input port of the submicroprocessor 203 turns high and lets the submicroprocessor 203 know that an instruction for the re-start of the playback operation with the same disc is given.

The previously described disc carrier means to convey a disc 5 to the position ready to be played back is represented by a block 214 labelled as "CAR DRV" in FIGS. 19 and 23. The disc carrier means 214 includes the previously mentioned carriage assembly 34 and the motor 38 (FIG. 6) for driving the carriage assembly 34. Represented by a block 216 labelled as "P/U DRV" in FIGS. 19 and 23 is the drive means to drive the optical signal pickup unit (indicated at 215 and labelled as P/U) of the player to move radially of the disc 5 during playback operation. The pickup drive means 216 includes the previously mentioned spindle drive motor 46 (FIG. 11). These disc carrier means 214 and pickup drive means 216 are energized from the main power source through a main power source switch element 217 connected in series with the accessory switch 207 as shown in FIG. 19. The main power source switch element 217 has a control terminal connected to the host microprocessor 200 so that each of the disc carrier means 214 and the pickup drive means 216 is energized and de-energized under the control of the microprocessor 200. The host microprocessor 200 has a function to cause the switch element 217 to open to interrupt the supply of power to each of these disc carrier and pickup drive means 214 and 216 if signals are supplied from any of external signal sources during playback of a disc 5. Examples of such external signal sources include a tuner and a tape deck which are frequently included in an uptodated disc player.

The information recorded on a disc 5 contains program data including address data and is optically read by the signal pickup unit 215 (labelled as P/U) which traces the record surface of the disc 5. The information thus ready by the pickup unit 215 is converted into electrical signals which are demodulated by a demodulator 218 (labelled as DMD) shown in FIG. 23. The demodulated signals are supplied to an address detector 219 (labelled as ADR DET) which is operative to extract the address data contained in the input signals and to determine the current position of the pickup unit 215 with respect to the rotating disc 5. The latest address data thus detected by the address detector 210 is loaded into the address memory 212 incorporated in the host microprocessor 200. Represented by a block 220 is a focus monitor circuit (labelled as FOCUS) which is operative to constantly monitor the output signal from the pickup unit 215 to see if proper locations of the disc 5 are being focused by the laser beam directed at the record surface of the disc from the pickup unit 215. The focus monitor circuit 220 produces an output signal when it is found that the beam emitted from the pickup unit 215 is incorrectly focused on the record surface of the disc 5. In response to this output signal from the focus monitor circuit 220, the host microprocessor 200 actuates the pickup drive means 216 for driving the pickup unit 215 for movement back to the home position thereof (at which the pickup unit actuates the position detector switch unit 101 as described with reference to FIGS. 6 and 11), thus interrupting the playback operation. The pickup unit 215 thus returned to the home position thereof with respect to the turntable 45 (FIGS. 11 and 12) is adjusted under the control of the host microprocessor 200 so that the laser beam directed at the disc 5 can be correctly focused on the record surface of the disc 5. The pickup unit 215 is then driven by the pickup drive means 216 for movement to the position represented by the last address which had been stored into the address memory 212 of the host microprocessor 200 before the improper focusing was detected by the focus monitor circuit 220. The playback operation with the same disc 5 is then started for a second time from this last address.

If and when the supply of the main source power is interrupted with, for example, the accessory switch 207 opened up during playback of a disc 5, a power interruption detector 221 (labelled as INT DET) responds this situation and produces an output signal informing the host microprocessor 200 that the supply of the main source power is interrupted. The output signal from this power interruption detector 221 is supplied to the address memory 212, from which the address information which has been last stored into the memory 212 from the address detector 219 by the time the supply of the main source power is interrupted is loaded into the backup memory 213. When the supply of the main source power is thereafter re-started with, for example, the accessory switch 207 closed for a second time, the playback operation is re-opened with the same disc 5 from the particular address memorized in the backup memory 213.

The host microprocessor 200 has further incorporated therein an address counter 222, (labelled as CNTR) which counts address bits at predetermined time intervals to produce, at each of these time intervals, an output signal indicative of the expected address to which the signal pickup unit 215 should be moved with respect to the rotating disc 5 in the next instant. The last address information stored in the address memory 212 and the expected address information thus produced by the address counter 222 are fed to an overshoot detector 223 (labelled as O/S DET) which is operative to compare the two input signals with each other to see if there is a discrepancy therebetween. If such a discrepancy is found to exist, the overshoot detector 223 determines that the spot picked up on the record surface of the disc 5 by the laser beam from the pickup unit 215 has overshot (or undershot) the target or expected track on the disc 5. When the discrepancy is once detected or the discrepancies are successively detected a predetermined number of times, the overshoot detector 223 produces an output signal to actuate the pickup drive means 216 to drive the pickup unit 215 for movement to the position complying with the expected address produced by the address counter 222. When, in this instance, the information read through the pickup unit 215 includes a control information, then the pickup point of the pickup unit 215 may be moved back to a position corresponding to the last address since the control signal should be preferably continuously read but not interrupted while program information such as music information may no be so much adversely affected even by a relatively short interruption as is well known in the art.

The control circuit shown in FIG. 23 further comprises a temperature-sensitive transducer element 224 such as typically a thermister which is located preferably in the neighborhood of or appropriately in conjunction with the pickup unit 215. The temperature-sensitive transducer element 224 is responsive to the temperature within the housing 2 (FIG. 1) and produces an output signal variable with the detected temperature. The output signal from the transducer element 224 is supplied to a temperature detector circuit 225 (labelled as TEMP DET), which is operative to produce an output signal when the temperature represented by the signal from the transducer element 224 is higher than a predetermined threshold value. The output signal from the temperature detector circuit 225 in turn is fed to the host microprocessor 200. In response to the signal from the detector circuit 225, the host microprocessor 200 functions to render the main power source switch element 217 (FIG. 19) into non-conduction state in the co-presence of a signal of, for example, a low level from the previously described position detector switch unit 104 (FIGS. 4 and 6). The signal from the temperature detector circuit 225 is, thus, effective if, and only if, the position detector switch unit 104 is maintained closed with the disc 5 held in the playback position on the turntable 45 (FIG. 11). The main power source switch element 217 being made open by the host microprocessor 200, both the carrier drive means 214 and the pickup drive means 216 are de-energized from the main power supply line 204 so that all the electrically powered drive means of the disc player are made inoperative. The disc player is thus held at rest until the disc player as a whole is cooled down to a predetermined temperature and the temperature detector circuit 225 ceases delivery of its output signal. If desired, the display means 202 (FIG. 19) may be utilized to display the temperature detected by the transducer element 224 after the position detector switch unit 104 has been closed and/or may be used as means to display an overheat warning signal in response to the output signal from the temperature detector circuit 225.

Figure 24:
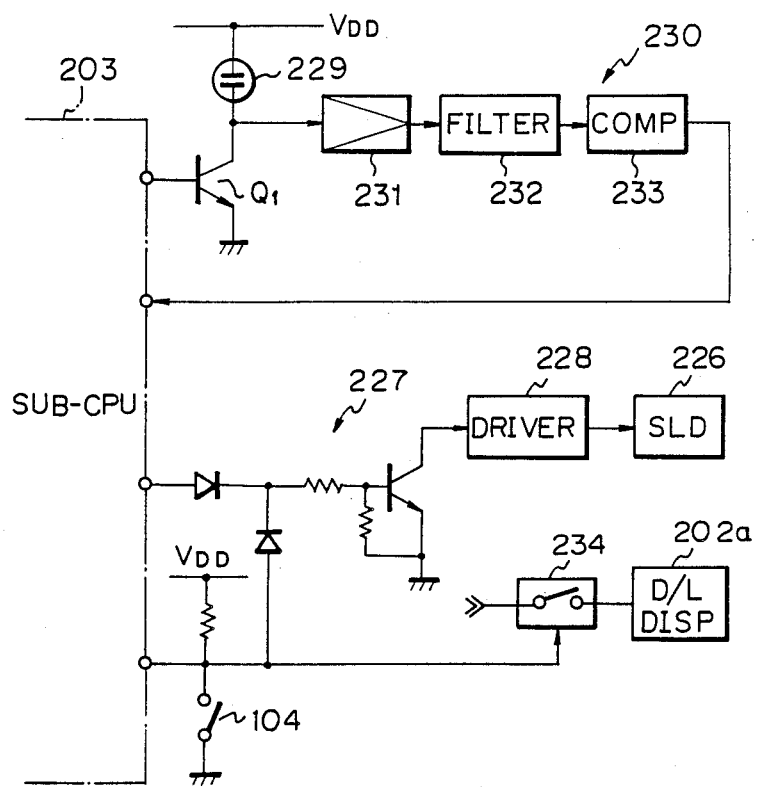
FIG. 24 is a block diagram showing the circuit arrangements of means to control the actuation of the laser diode used as signal pickup means in the player system embodying the present invention and of means to control the servo ranges operable in the player system embodying the present invention.

The signal pickup unit 215 of the disc player embodying the present invention has incorporated therein a semiconductor laser diode 226 (labelled as SLD in FIG. 24) to emit a laser beam to pick up and read information from the record surface of the disc 5. The semiconductor laser diode 226 is activated by a diode actuation signal of, for example, a low level supplied from the submicroprocessor 203 in the presence of a signal of, for example, a low level from the above mentioned position detector switch unit 104. As shown in FIG. 24, the diode actuation signal from the submicroprocessor 203 is fed to one input terminal of a two-input negative-logic AND gate circuit 227 which receives at the other input terminal thereof a signal of a low level from the position detector switch unit 104 with the disc 5 held in the playback position on the turntable. In the presence of the signals of low levels at both of its input terminals, the AND gate circuit 227 produces at its output terminal a signal of a low level. The logic "1" output signal from the AND gate circuit 227 is fed to a driver network 228 (DRIVER) for the semiconductor laser diode 226 and thus activates the laser diode 226 through the driver circuit 228, causing the diode 226 to emit a laser beam toward the disc 5 on the turntable. Thus, the laser diode actuation signal from the submicroprocessor 203 is also effective if, and only if, the position detector switch unit 104 is maintained closed with the disc 5 held in the playback position on the turntable 45 (FIG. 11).

As is further, shown in FIG. 24, there is provided a piezoelectrically activated buzzer 229 which serves as means to detect shocks and vibrations transferred to the housing 2 of the disc player. The piezoelectric buzzer 229 is connected through a transistor $Q_1$ to the submicroprocessor 203 and is actuated to produce sounds in response to a control signal supplied from the submicroprocessor 203 to the transistor $Q_1$. The output signal from the piezoelectric buzzer 229 is supplied to a vibration detector network 230 which is operative to detect shocks and vibrations transmitted to the housing 2. The vibration detector network 230 comprises an amplifier 231 to amplify the output signal from the piezoelectric buzzer 229 and a filter circuit 232 (FILTER) which serves as an equalizer to produce an output signal having a frequency characteristic inverse to that of the output signal from the piezoelectric buzzer 229. The vibration detector network 230 further comprises a comparator 233 (labelled as COMP) which receives the output signal from the filter circuit 232 and compare the input signal with a reference signal representative of a predetermined degree of vibrations. The comparator 233 produces an output signal indicative of the difference between the degree of vibrations represented by the output signal from the piezoelectric buzzer 229 and the degree of vibrations represented by the reference signal and supplies the output signal to the submicroprocessor 203.

In a disc player equipped with servo systems such as a focus servo system, a tracking servo system and a tangential servo system, the influences by external disturbances can be alleviated to provide an increased resistance to vibrations transmitted to the player when broadened servo ranges are used to increase the servo gains, as well known in the art. On the other hand, the presence of scratches, fingerprints or other defects on the record surface of disc may result in production of error signals causing, for example, overshooting of tracks by the laser beam. The influences by the internal disturbances resulting from such error signals become pronounced when broadened servo ranges are used since the broadened servo ranges will result in amplification of the error signals as also well known in the art. In designing a disc player for home use, the servo ranges can be selected with a more emphasis placed on the signal reading ability of the pickup unit, viz., on the resistance to presumed internal disturbances than on the influence from external disturbances since such a disc player is not likely to be constantly or frequently subjected to shocks and vibrations during use. A disc player to be used on a motor vehicle is, however, subject to constant and occasionally violent shocks and vibrations and, in the case of a disc player of this type, a designer can not contemplate selection of such servo ranges that will provide satisfactory degrees of resistance to both external and internal disturbances. The circuit arrangement described with reference to FIG. 24 as above provides a judicious compromise between these mutually conflicting requirements by making it possible to automatically shift the servo ranges in response to shocks and vibrations exceeding a predetermined limit degree represented by the reference signal constantly impressed on the comparator 233. Thus, the disc player system embodying the present invention further comprises tracking servo means (not shown) for controlling the movement of the information pickup spot (the spot at which the laser beam emitted from the pickup unit 215 is incident on the record surface of the disc 5) in a radial direction of the disc, the servo means having a predetermined normal operable range. In this instance, the submicroprocessor 203 shown in FIG. 24 further comprises servo control means (not shown) responsive to the output signal from the comparator 233 of the detector circuit 230 for broadening the operable range of the tracking servo means in response to the signal from the comparator 233 and shifting the broadened operable range to the predetermined normal operable range in the absence of a signal produced from the comparator 233 during a predetermined length of time after a signal has once been produced therefrom. It will be apparent that means similar to the control means for the tracking servo system as above described may also be provided for the focus servo system and/or the tangential servo system of the player if desired.

Meanwhile, there will be a case where the user of the disc player may inadvertently try to insert another disc through the slot 3a (FIG. 1) while a disc preliminarily inserted into the player is maintained in a wait condition within the housing. To provide a warning signal to preclude such double loading of discs, the previously described display means 202 (FIG. 19) include in the circuit arrangement of FIG. 24 a disc load display element 202a connected to the position detector switch unit 104 (FIGS. 4 and 6) as shown. The disc load display element 202a is operative to provide a visual indication that a disc has been inserted into the housing 2 and is currently maintained in the playback position when the switch unit 104 is closed. On the other hand, the host microprocessor 200 of the control circuit shown in FIG. 19 has a function to disconnect each of the disc carrier and pickup drive means 214 and 216 from the main power source when signals are supplied from any of external signal sources such as a tuner and a tape deck during playback of a disc 5, as described previously. In the circuit arrangement shown in FIG. 24, the above mentioned disc load display element 202a (labelled as D/L DISP) may be also connected to the main power source not only across the switch 207 (FIG. 19) but also across a switch 234 having a control terminal connected to the position detector switch unit 104. When signals are being supplied from such an external source with a disc held in the playback position within the housing 2, the disc load display element 202a is also made operative to warn that a disc has already been inserted into the player although the player per se remains at rest.

Figure 25:
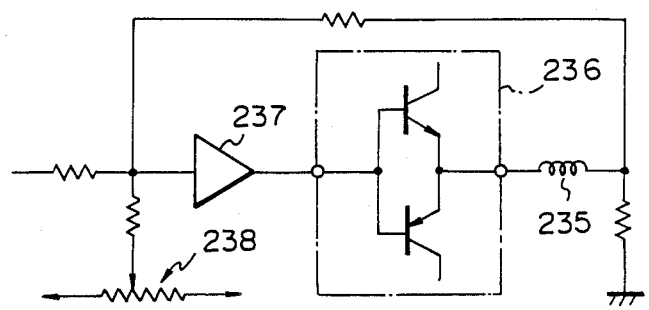
FIG. 25 is a diagram showing the circuit arrangement including a driver network for the coil to drive the laser diode in the player system embodying the present invention.

The semiconductor laser diode 226 shown in FIG. 24 depends for its durability on the ambient temperature and is caused to reduce its lifetime when used at high temperatures, it being thus desirable that the diode 226 be located remote from sources of heat. One of these sources of heat is included in a driver circuitry to drive the objective lens 33a forming part of the optical signal pickup means described with reference to FIG. 8. In FIG. 25, the driver circuitry for the objective lens 33a is shown including a coil 235 connected to a driver network 236. The driver network 236, which constitutes a source of heat, is mounted on a unit which is separate from a unit on which the semiconductor laser diode 226 as well as the signal pickup unit 215 (FIG. 23) which includes a variable resistor to adjust the gain of an amplifier 237 preceding to the driver network 236. The two units being physically separated from each other, the semiconductor laser diode 226 forming part of the signal pickup unit 215 is thermally isolated from the driver network 236 which is an important source of heat in the player control circuit.

Description will be hereinafter made regarding the modes of operation of the player control circuit hereinbefore described.

When the playback start pushbutton 6a among the pushbuttons 6 arranged on the front panel of the housing 2 (FIG. 1) is manually depressed, a playback start instruction signal is issued from the host microprocessor 200 shown in FIGS. 19 and 23. By this playback start instruction signal from the host microprocessor 200, the spindle drive motor 46 (FIG. 11) and the motor 38 (FIG. 6) for driving the carriage assembly 34 are actuated to start. The turntable 45 is now driven for rotation with the disc 5 carried thereon and the signal pickup unit 215 is driven for rearward movement from its predetermined home position with respect to the turntable 45 thus rotating.

Figure 26:
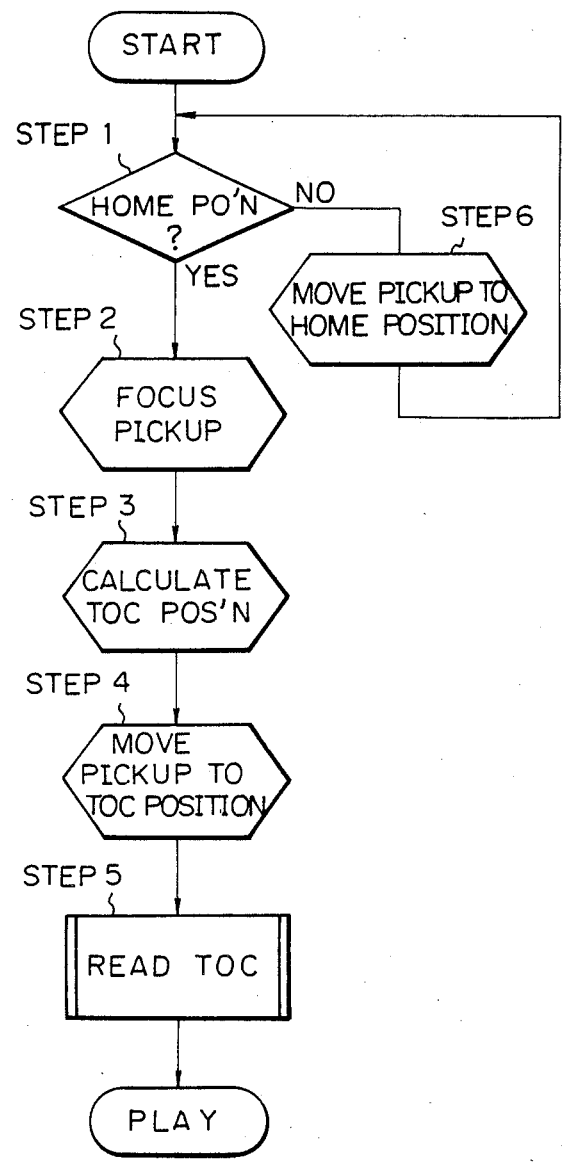
FIGS. 26 to 30 are flowchart showing the various steps to be taken in the control circuit shown in FIGS. 19 and 23 for the playback operation of the disc player embodying the present invention.

In response to the playback start instruction signal from the host microprocessor 200, it is first determined whether or not the position detector switch unit 101 (FIGS. 6 and 10) responsive to the home position of the pickup unit 215 is closed as indicated by step 1 in the flowchart of FIG. 26. If the position detector switch unit 101 is found closed, the pickup unit 215 is adjusted as in step 2 so that the laser beam to be emitted from the semiconductor laser diode 226 (FIG. 24) can be correctly focused on the record surface of the disc 5 on the turn table 45. The step 2 is followed by step 3 in which the position of the pickup unit 215 with respect to the table-of-content location (TOC) in the lead-in area of the disc is calculated from the address information produced from the pickup unit 215 in the home position. The table of contents of the disc contains information representative of the number of musical or other programs recorded on the disc, the total amount of time for the playback of all the programs, the amount of time for the playback of each of the programs, and so on. All these pieces of information must be read from the disc before the playback operation with the disc is started. A method of calculating such a position of the pickup unit 215 with respect to the table-of-content location of the disc is disclosed in, for example, Japanese Patent Application No. 58-201994 which teaches that the distance between the current position of the pickup unit and the target position (which corresponds to the table-of-content location of the disc) can be calculated more accurately as the pickup unit moves closer to the target position. In accordance with the method disclosed therein, the pickup unit is driven for movement by calculating the distance of the pickup unit from the target position repeatedly until the distance becomes a predetermined value. Thus, the closer the predetermined home position of the pickup unit to the table-of-content location of the disc, the earlier will the pickup unit be enabled to reach the target position with respect to the disc.

When the position of the pickup unit 215 with respect to the table-of-content location of the disc 5 is calculated in this manner from the address information produced from the pickup unit 215, the pickup unit 215 is driven to move from the home position thereof by a control signal from the host microprocessor 200 as in step 4. Information is now read by the pickup unit 215 at the table-of-content location of the disc on the turntable 45 as in step 5. If the pickup unit 215 happens to be off the correct home position when the playback start pushbutton 6a is closed and as a consequence the position detector switch unit 101 is found open, the pickup drive means 216 (FIG. 19) is actuated by a control signal supplied from the host microprocessor 200 to drive the pickup unit 215 for movement to the correct home position thereof, as indicated by step 6.

Figure 27B:
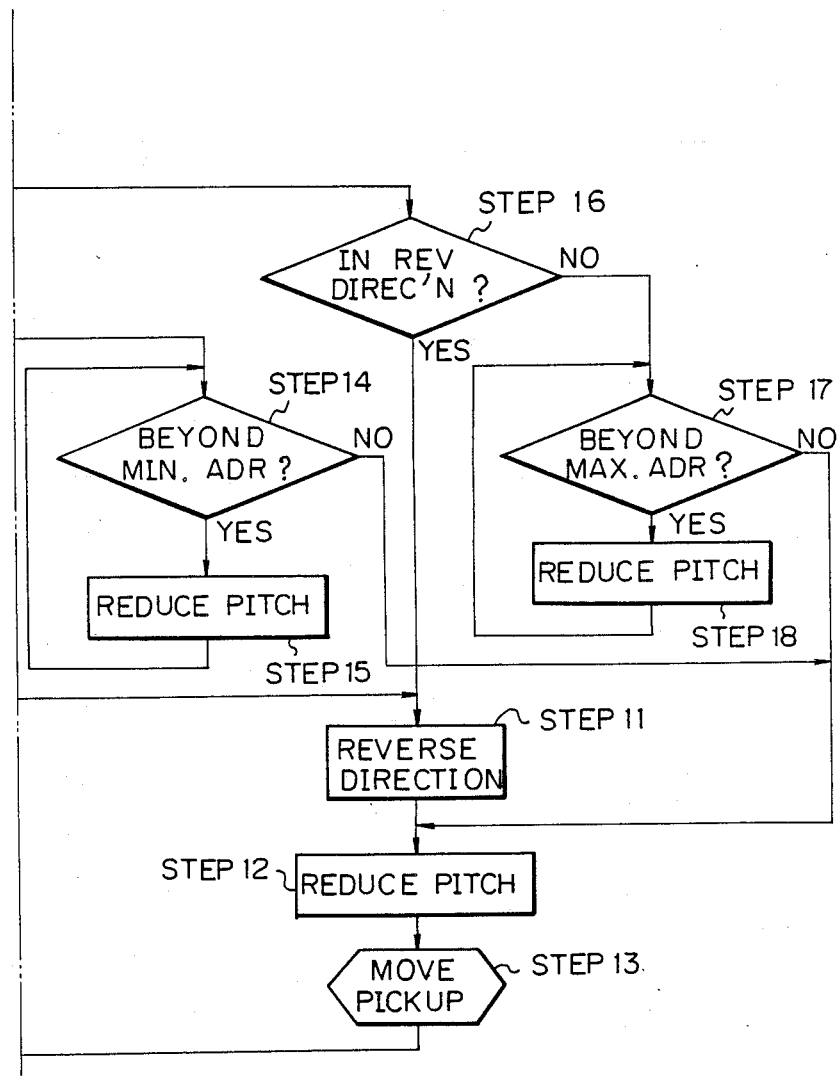

After the table of contents in the lead-in area of the disc 5 is read out by the pickup unit 215 by the step 5, the pickup unit 215 is further driven to stepwise move at a predetermined initial pitch in a direction toward the address of the program designated by the user, as indicated by step 7 in the flowchart of FIG. 27. The step 7 is followed by step 8 to see if the current address coincides with the address of the designated program. If it is determined that the current address is not identical with the address of the designated program, then it is determined whether or not the current address is larger than the address of the designated program as in step 9. If the answer in the step 9 is in the affirmative, it is determined in the subsequent step 10 whether or not the pickup unit 215 has been driven for movement in a forward (FWD) direction, viz., away from the inner perimeter toward the outer perimeter of the disc 5. If it is determined that the pickup unit 215 has been driven for movement in the forward direction, the step 10 is followed by step 11 in which the pickup drive means 216 (the motor 38 shown in FIG. 6) is controlled to operate in the opposite direction and further by step 12 in which the pitch at which the pickup unit 215 is to be driven to stepwise move is reduced. The pickup unit 215 is now driven to stepwise move at the reduced pitch in the reverse direction, viz., away from the outer perimeter toward the inner perimeter of the disc 5 as in step 13.

If it is determined in the step 10 that the pickup unit 215 has been driven for movement in the reverse direction, the step 10 is followed by step 14 to see if the pickup unit 215 will move beyond the minimum address of the information record area of the disc 5 if the pitch of the stepwise movement of the pickup unit 215 is maintained. If the answer in this step 14 is in the affirmative indicating that the pickup unit 215 will move beyond the minimum address of the information record area of the disc 5 if the pitch of the stepwise movement of the pickup unit 215 is maintained, the step 14 is followed by step 15 in which the pitch of the stepwise movement of the pickup unit 215 is reduced. Subsequent to the step 15, the operation returns to the step 14 to see if the pickup unit 215 will move beyond the minimum address of the information record area of the disc 5 if the pickup unit 215 is moved at this reduced pitch. The steps 14 and 15 are repeated to reduce the pitch of stepwise movement until it is finally determined in the step 14 that the pickup unit 215 will not move beyond the minimum address of the information record area of the disc 5 if the pickup unit 215 is moved at the finally reduced pitch. When the reduced pitch of stepwise movement of the pickup unit 215 is thus determined finally, the pickup unit 215 is driven to stepwise move at the particular pitch away from the outer perimeter toward the inner perimeter of the disc 5 by the step 13 following the step 12.

If the answer in the step 9 is in the affirmative indicating that the current address is less than the minimum address of the information record area of the disc 5, it is determined in step 16 whether or not the pickup unit 215 has been driven for movement in the reverse (REV) direction, viz., away from the outer perimeter toward the inner perimeter of the disc 5. If it is determined in this step 16 that the pickup unit 215 has been driven for movement in the reverse direction, the step 16 is followed by step 11 in which the pickup drive means 216 is controlled to operate in the opposite direction and further by step 12 in which the pitch at which the pickup unit 215 is to be driven to stepwise move is reduced. The pickup unit 215 is now driven to stepwise move at the reduced pitch in the reverse direction by the step 13 as described above.

If it is determined in the step 16 that the pickup unit 215 has been driven for movement in the forward direction, the step 16 is followed by step 17 to see if the pickup unit 215 will move beyond the minimum address of the information record area of the disc 5 if the initial pitch of the stepwise movement of the pickup unit 215 is maintained. If the answer in this step 17 is in the affirmative indicating that the pickup unit 215 will move beyond the final, viz., maximum address of the information record area of the disc 5 if the pitch of the stepwise movement of the pickup unit 215 is maintained, the step 17 is followed by step 18 in which the pitch of the stepwise movement of the pickup unit 215 is reduced. Subsequently to the step 18, the operation returns to the step 17 to see if the pickup unit 215 will move beyond the maximum address of the information record area of the disc 5 if the pickup unit 215 is moved at this reduced pitch. The steps 17 and 18 are repeated to reduce the pitch of stepwise movement until it is finally determined in the step 17 that the pickup unit 215 will not move beyond the maximum address of the information record area of the disc 5 if the pickup unit 215 is moved at the finally reduced pitch. When the reduced pitch of stepwise movement of the pickup unit 215 is thus determined finally, the pickup unit 215 is driven to stepwise move at the particular pitch away from the outer perimeter toward the inner perimeter of the disc 5 by the step 13 following the step 12.

The minimum and maximum addresses of the information record area of the disc 5 as above mentioned are calculated from the information read from the table of contents of the disc 5 and are memorized as minimum and maximum lengths of time, respectively, in the host microprocessor 200. In each of the steps 14 and 17, the distance of stepwise movement of the pickup unit 215 which has been moved from the home position is converted into a length of time. The length of time is added to or subtracted from the absolute time represented by the current address and it is determined whether or not the resultant sum or difference is larger than the maximum or minimum length time, respectively, memorized in the host microprocessor 200. If the sum is found larger than the maximum length of time, it is determined that pickup unit 215 will be moved beyond the maximum address of the information record area of the disc 5 while, if the difference is found larger than the minimum length of time, then it is determined that pickup unit 215 will be moved beyond the minimum address of the information record area of the disc 5.

Figure 28:
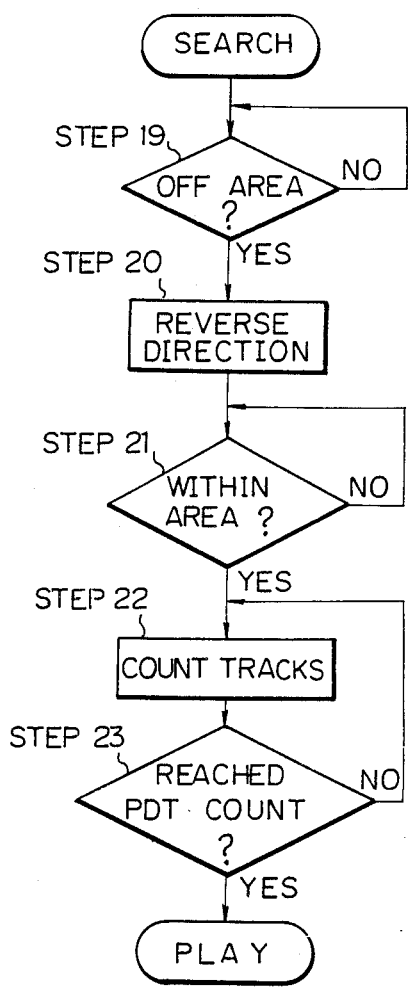

Even when the address of the designated program is located in proximity to the maximum or minimum address of the information record area of the disc 5, the pickup unit 215 is precluded from being moved at improperly large steps out of the coverage of the information record area of the disc 5. The pickup unit 215 might however happen to be caused to move out of the coverage of the information record area to, for example, a plain mirror-surface area of the disc 5 for any reason. In this instance, the pickup unit 215 can be moved back to the proper position by following the steps shown in FIG. 28 of the drawings.

On the basis of the signals produced by the pickup unit 215, it is determined in step 19 whether or not laser beam directed at the record surface of the disc 5 from the pickup unit 215 is focused thereon in the plain mirror-surface area of the disc 5. If the answer in the step 19 is affirmative indicating that the pickup unit 215 is moved to a position covering the plain mirror-surface area of the disc 5, the step 19 is followed by step 20 in which the pickup drive means 216 (the motor 38 shown in FIG. 6) is controlled to operate in the opposite direction and further by step 21 to determine whether or not the spot of the laser beam directed at the record surface of the disc 5 is located within the information record area of the disc 5. If it is determined that the spot of the laser beam falls within the information record area of the disc 5, the number of the record tracks traversed by the laser beam is counted from the signals produced by the pickup unit 215 as in step 22. When the count of the traversed record tracks reaches a predetermined value as in step 23, the pickup unit 215 is driven to move for readout operation. The pickup unit 215 can thus be returned to the correct position with respect to the disc 5 if the pickup unit 215 is moved out of the coverage of the information record area of the disc 5 due to, for example, warpage of the disc in use.

Figure 29:
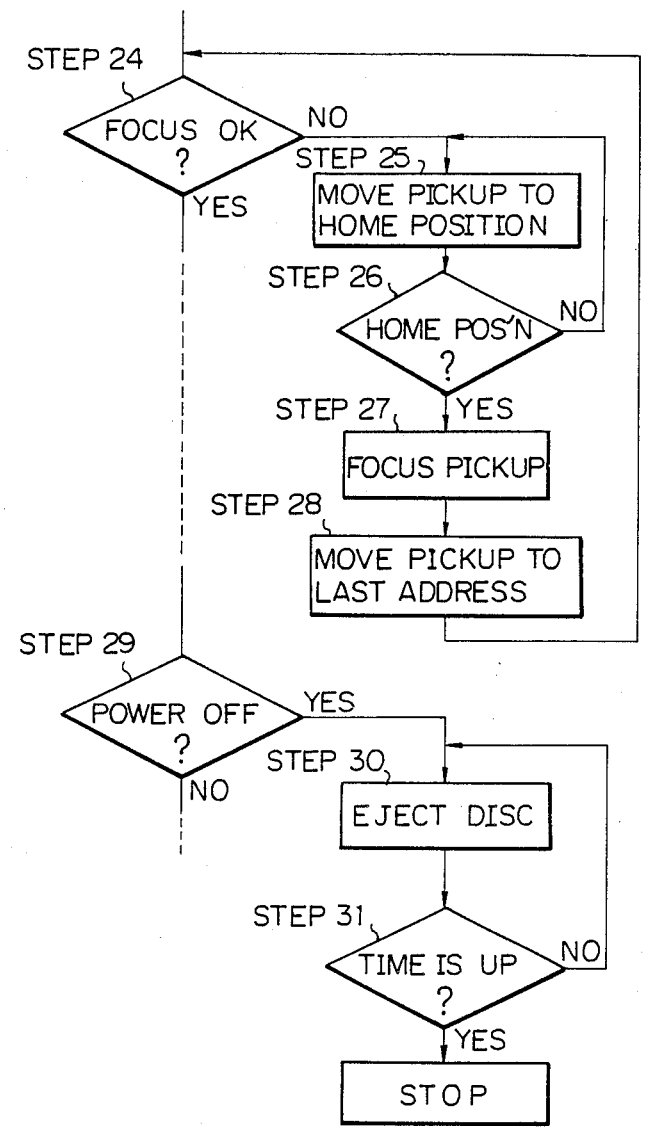

FIG. 29 is a flowchart showing the steps to be taken when the laser beam emitted from the pickup unit 215 fails to be correctly focussed on the record surface of the disc 5 being played back.

When it is found that this is occurring as in step 24 of the flowchart of FIG. 29, the pickup drive means 216 (FIG. 19) is controlled to drive the pickup unit 215 for movement back to the home position thereof as in step 25. The step 25 is followed by step 26 to see if the pickup unit 215 is correctly returned to the home position. The focus servo is then controlled to provide proper focusing of the laser beam as in step 27. The pickup drive means 216 is for a second time actuated in step 28 to drive the pickup unit 215 to the position represented by the last address read from the disc 5, viz., the position which the pickup unit 215 assumed immediately before improper focusing of the laser beam was detected, thus re-starting the playback operation for the selected program. The last address read by the pickup unit 215 from the disc 5 is stored in and can thus be read from the address memory 212 shown in FIG. 23.

If, on the other hand, the previously mentioned accessory switch 207 (FIG. 19) of an automotive vehicle is made open during playback operation, it is determined in step 29 of the flowchart of FIG. 29 that the supply of power to the player system is interrupted. In this instance, the step 29 is followed by step 30 in which the drive means to have the disc 5 ejected from the disc player system is actuated to withdrawn the disc from the housing 2. The disc eject drive means is maintained operative until it is questioned in step 31 whether or not a predetermined length of time has lapsed after the drive means is actuated. If it is found by this step 31 that the predetermined length of time has lapsed after the drive means is actuated, the disc eject drive means is made at rest and the player system as a whole is maintained in a wait condition. The predetermined length of time herein mentioned is the period of time which intervenes between a time at which the turntable 45 is driven to move upwardly to transfer the disc 5 to the disc transfer plate 22 (FIG. 18) and a time at which the disc 5 is clamped between the transfer plate 22 and the clamp member 52 on the support plate 51 (FIG. 6). The disc being withdrawn from the player system is thus prevented from being deformed during transport since it is stably placed on the surface of the disc transfer plate 22 and from being subjected to upward or downward movement since it is clamped between the transfer plate 22 and the clamp member 52 until the disc is completely withdrawn from the player system. Forced ejection of the disc out of the disc player system in the above described fashion may be effected not only in response to the interruption of the power supply but in the event of any other unusual operation of the player system or when the input of the player system is shifted to any external signal source. When the supply of power to the player system from the main power source is interrupted with the input of the player system shifted to an external signal source, the carrier drive means 214 alone may be connected to a backup power source included in, for example, the submicroprocessor 203 to forcibly withdraw the disc from the player system by following the steps 30 and 31 of the flowchart of FIG. 29.

Figure 30:
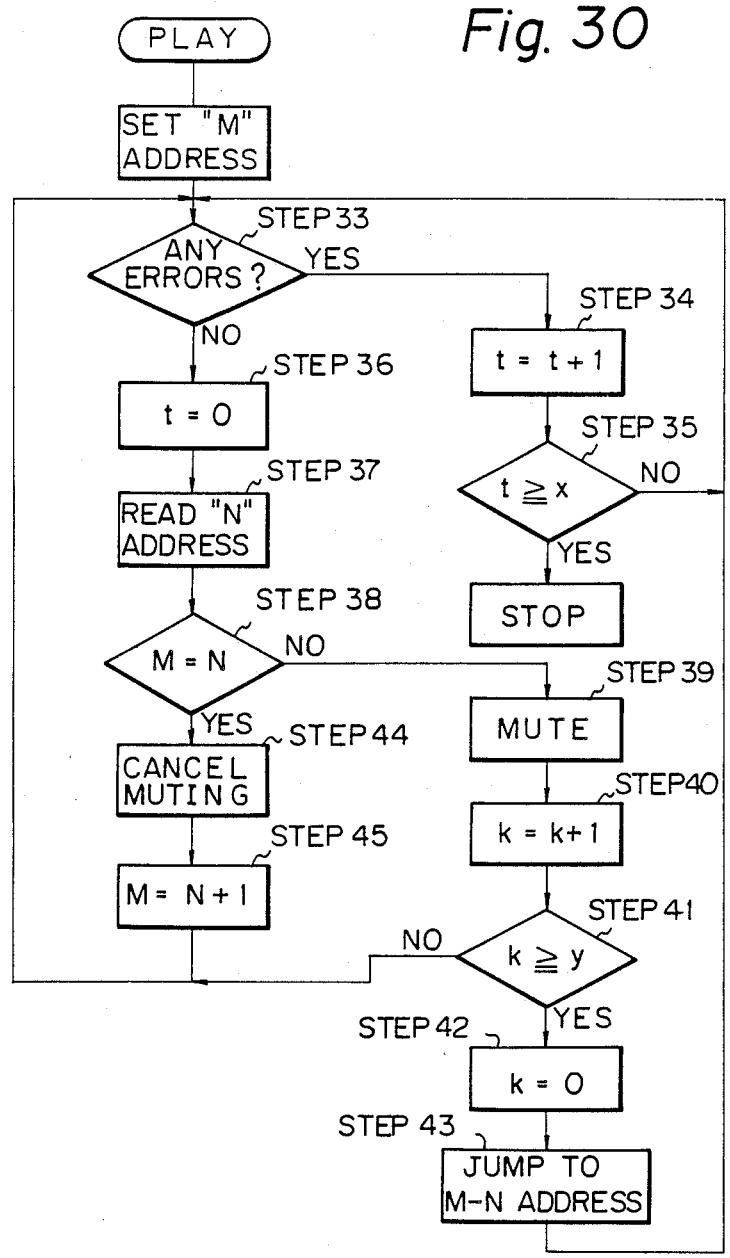

During usual playback operation, an initial expected address M to be read out from the disc 5 being played back is set as in step 32 in the flowchart of FIG. 30. This step 32 is followed by a step 33 to see if an error exists between the address M thus formulated and each of the addresses successively read from the disc 5 by the pickup unit 215. If and each time an error is detected to exist in the step 33, the count t of the errors detected is incremented by one ($t=t+1$) as in step 34. If the count t of the detected errors is found to be less than a predetermined number x in step 35, the step 33 is restored and, if the count t of the detected errors is found to be larger than the predetermined number x in the step 35, then the playback operation is interrupted. If, on the other hand, it is determined than there is no errors detected in the step 33, the count t of errors is reset to a zero status as in step 36 and the address N of the newest playback frame is read from the disc 5 as in step 37. Thereupon, it is determined in step 38 whether or not the address N last read from the disc 5 is identical with the expected address M which has been set in the step 32. If it is found in this step 38 that the address N last read from the disc 5 is not identical with the expected address M, it is determined that the expected record track of the disc 5 being played back has been missed by the laser beam and, in the subsequent step 39, generation of sound signals is interrupted to produce a "muting" condition in the player system. Each time it is found in the step 38 that the address N last read from the disc 5 is not identical with the expected address M, the count k of the non-coincidences between the address M and address N is incremented by one ($k=k+1$) as in step 40. Subsequently to this step 40, it is determined whether or not the count k of the non-coincidences is larger than a predetermined number y in step 41. If the answer in this step 41 is in the negative indicating that the count k of the non-coincidences between the address M and address N is smaller than the predetermined number y, the step 41 is followed by the preceding step 33 to see if errors are detected between the expected address M and the addresses actually read from the disc 5. If, on the other hand, it is determined in the step 41 that the count k of the non-coincidences between the address M and address N is larger than the predetermined number y, the count k of the noncoincidences between the address M and address N is reset to a zero state as in step 42, Thereupon, the pickup unit 215 is moved to a position in which the spot of the laser beam incident on the record surface of the disc 5 is jumped through addresses of a number corresponding to the difference between the addresses M and N to the location of the expected address M, as in step the 43. This step 43 is also followed by the step 33. If it is found in the step 38 that the address N last read from the disc 5 is identical with the expected address M and is the muting condition has been established, the muting condition is cancelled as in step 44 and the expected address M is updated to $N+1$ by step 45 followed by the step 33. The steps 32 to 45 as above described are repeated a number of times until the playback operation for a selected program is complete.

When the pickup unit 215 reaches a predetermined limit position with respect to the support structure 28 (FIG. 6), the motors 38 and 46 are brought to a stop so that the turntable 45 stops rotation and the carriage assembly 34 stops movement along the screw shaft 37. The main drive motor 20 is now actuated to start rotation in the opposite direction, driving the tray structure 10, movable members 13 and 14, disc transfer plate 22 and disc clamping member 52 for movement through a reversal of the motions hereinbefore described. These members and units are thus returned to their respective initial positions in the housing 2 and the pickup unit 215 is moved back to the initial home position thereof with the motor 38 also actuated to start rotation in the opposite direction. The disc 5 which has been played back is accordingly conveyed forwardly in the housing 2 and is withdrawn out of the housing 2 through the slot 3a.

While only one preferred embodiment of an automatic disc player according to the present invention has thus far been described, such an embodiment is simply illustrative of the gist of the present invention and may thus be changed or modified in numerous manner if desired.

What is claimed is:

1. An automatic disc player comprising signal pickup means operative to read information from a disc on which at least one of program and control signals including address information is recorded and to convert the information read from the disc into electric signals, the signal pickup means being movable with respect to the disc in a predetermined direction within the player and the signals being read from the disc at an information pickup spot which is movable with respect to the tracks on the disc, and pickup drive means operative to drive said signal pickup means for movement with respect to the disc in the player, wherein the improvement comprises:

a counter operative to count addresses at predetermined time intervals for producing a signal representative of an expected address indicative of the position to which said pickup means is expected to move in the next, said expected address thus being renewed at said predetermined time intervals;

a detector circuit operative to constantly detect a discrepancy between the newest one of the addresses read from the disc by said signal pick up means and said expected address and to produce a discrepancy detection signal each time when said discrepancy is found to exist; and pickup drive control means for actuating said pickup drive means to drive said pickup means for movement to a position dictated by the expected address when said discrepancy detection signal appears successively a predetermined number of times.

2. An automatic disc player as set forth in claim 1, further comprising:

tracking servo means for controlling the movement of said information pickup spot in a radial direction of the disc to keep minimum deviations of said information pickup spot from a target track, the servo means having a predetermined operable range; and external disturbance detect means for detecting external disturbances so as to generate a signal;

said pickup drive control means further comprising servo control means responsive to a signal from said external disturbance detect means for broadening the operable range of said tracking servo means in response to the signal from said external disturbance detect means and shifting the broadened operable range to said predetermined operable range in the absence of said signal produced from said external disturbance detect means during a predetermined length of time after said signal has been produced from said external disturbance detect means.

3. An automatic disc player as set forth in claim 1, further comprising disc playback means for playing back the disc in said predetermined playback position, said pickup drive means forming part of said disc playback means, and vibration attenuating means elastically supporting said disc playback means on a plane perpendicular to the center axis of the disc in said predetermined playback position.

4. An automatic disc player comprising signal pickup means operative to read information from a disc on which at least one of program and control signals including address information are recorded and to convert the information read from the disc into electric signals, the signal pickup means being movable with respect to the disc in a predetermined direction within the player and the signals being read from the disc at an information pickup spot which is movable with respect to the tracks on the disc, and pickup drive means operative to drive said signal pickup means for movement with respect to the disc in the player, wherein the improvement comprises:

a counter operative to count addresses at predetermined time intervals for producing a signal representative of an expected address indicative of the position to which said pickup means is expected to move in the next, said expected address thus being renewed at said predetermined time intervals;

a detector circuit operative to constantly detect a discrepancy between the newest one of the addresses read from the disc by said signal pickup means and said expected address and to produce a discrepancy detection signal each time when said discrepancy is found to exist;

signal discriminating means operative to determine whether the information being read from the disc is the control information or the program information; and said pickup drive control means being responsive to said signal from said counter for actuating said pickup drive means to drive said pickup means for movement to the position indicated by said expected address when the information being read from the disc is determined by said discriminating means to be the program information and to the position indicated by said newest address when the information being read from the disc is determined by said discriminating means to be the control information.

5. An automatic disc player as set forth in claim 1 or 2, in which said pickup drive control means responsive to the discrepancy detection signals from said detector circuit is adapted to drive said pickup means for movement to the position dictated by the expected address represented by the signal from said counter when a predetermined number of signals are produced successively from said detector circuit.

6. An automatic disc player for playing back a disc having recorded thereon program information including address information, comprising optical signal pickup means operative to read information from the disc with a beam of radiation and to convert the information read from the disc into electric signals, the signal pickup means being movable with respect to the disc in a predetermined direction from and back to a predetermined home position and the information being read from the disc at an information pickup spot which is movable with respect to the tracks on the disc, pickup drive means operative to drive said signal pickup means for movement with respect to the disc in the player, and an electric control circuit including a focus monitor circuit for constantly monitoring the output signals from said signal pickup means to see if the radiation beam emitted from the signal pickup means is correctly focussed on the record surface of the disc, the focus monitor circuit being operative to produce an output signal when it is found that the radiation beam emitted from the pickup means is incorrectly focused on the record surface of the disc, said pickup drive means being responsive to the signal from the focus monitor circuit for driving the signal pickup means for movement to said home position for permitting the pickup means to be adjusted so that the radiation beam to be directed at the disc can be correctly focused on the record surface of the disc.

7. An automatic disc player as set forth in claim 6, in which said control circuit further includes an address memory for storing therein the newest one of the addresses read from the disc by said signal pickup means, said pickup drive means being further operative to drive said signal pickup means for movement from said predetermined home position to the position represented by the last address stored in said address memory.

8. An automatic disc player as set forth in claim 7, in which said control circuit further comprises control means responsive to the signals from said detector circuit for producing a control signal when a predetermined number of signals are sequentially produced from the detector circuit, said control signal being supplied to said pickup drive means for driving said pickup means for movement to the position represented by said expected address.

9. A method of starting playback operation in a disc player for playing back a disc having recorded thereon at least one of program and control signals including address information, the disc player including disc carrier means for moving the disc to a predetermined playback position and signal pickup means operative to read information from the disc, the signal pickup means being movable in a predetermined direction with respect to the disc, comprising:

establishing a home position of the pickup means at a place falling within the coverage of the pickup means covering the information recorded area of the disc, reading information from said information recorded area of the disc in said playback position with said signal pickup means held in said home position thereof, detecting the starting location of said information recorded area of the disc on the basis of the information read from the disc, driving the pickup means from the home position to a position capable of reading information at the starting location of the information recorded area of the disc, and starting the playback operation at the starting location of the information recorded area of the disc.

10. In a disc player, a method of searching the address of a designated program from a disc having an information recorded area on which program information including address information is recorded, said disc player including signal holding means for holding the disc in a predetermined playback operation throughout playback operation, signal pickup means operative to read information from the disc and movable with respect to the disc in said predetermined playback position, the method comprising the steps of searching into said information recorded area for the minimum and maximum addresses of the area, memorizing the minimum and maximum addresses thus accessed, driving said signal pickup means to stepwise move at a predetermined initial pitch toward a position represented by the address of said designated program, determining whether or not the address currently read by the pickup means will be moved beyond said minimum address or said maximum address if the pickup means is further driven for movement at said initial pitch, driving said signal pickup means to stepwise move at said initial pitch toward the position represented by the address of said designated program, if it is determined that the current address location of the pickup means will not be moved beyond said minimum address or said maximum address, and if it is determined that the current address location of the pickup means will be moved beyond said minimum address or said maximum address, stepwise reducing the pitch of movement of the signal pickup means repeatedly until it is determined that the current address location of the pickup means will not be moved beyond said minimum address or said maximum address if the pickup means is further driven for movement at the last reduced pitch, and driving said signal pickup means to stepwise move at said last reduced pitch toward the position represented by the address of said designated program.

11. An automatic disc player comprising signal pickup means operative to read information from a disc on which program information including address information is recorded and to convert the information read from the disc into electric signals, the signal pickup means being movable with respect to the disc in a predetermined direction within the player and the information being read from the disc at an information pickup spot which is movable with respect to the tracks on the disc, and pickup drive means operative to drive said signal pickup means for movement with respect to the disc in the player;

an address memory for storing the newest one of the addresses read from the disc by said signal pickup means;

a counter operative to count addresses at predetermined time intervals for producing a signal representative of an expected address indicative of the position to which said pickup means is expected to move in the next, said expected address thus being renewed at predetermined time intervals;

a detector circuit operative to constantly detect a discrepancy between said newest address and said expected address and to produce a discrepancy detection signal each time when said discrepancy is found to exist;

pickup drive control means responsive to said discrepancy detection signal from said detector circuit for actuating said pickup drive means to drive said pickup means for movement to the position dictated by one of said newest addresses and the expected address represented by the signal from said counter in response to said discrepancy detection signal;

tracking servo means for controlling the movement of said information pickup spot in a radial direction of the disc to keep minimum deviations of said information pickup spot from a target track, the servo means having a predetermined operable range; and external disturbance detect means for detecting external disturbances so as to generate a signal;

said pickup drive control means further comprising servo control means responsive to a signal from said external disturbance detect means for broadening the operable range of said tracking servo means in response to the signal from said external disturbance detect means and shifting the broadened operable range to said predetermined operable range in the absence of said signal produced from said external disturbance detect means during a predetermined length of time after said signal bas been produced from said external disturbance detect means.

12. An automatic disc player as set forth in claim 11, in which said pickup drive control means responsive to the discrepancy detection signals from said detector circuit is adapted to drive said pickup means for movement to the position dictated by the expected address represented by the signal from said counter when a predetermined number of signals are produced successively from said detector circuit.

* * * * *